US012472119B2

(12) United States Patent
Kaelin, Jr. et al.

(10) Patent No.: US 12,472,119 B2
(45) Date of Patent: Nov. 18, 2025

(54) ORTHOPEDIC DEVICE

(71) Applicant: IIWWMS, Inc., Mount Juliet, TN (US)

(72) Inventors: Charles R. Kaelin, Jr., Mt. Juliet, TN (US); Gary D. Renfro, Lebanon, TN (US)

(73) Assignee: IIWWMS, Inc., Mount Juliet, TN (US)

( * ) Notice: Subject to any disclaimer, the term of this patent is extended or adjusted under 35 U.S.C. 154(b) by 0 days.

(21) Appl. No.: 18/654,810

(22) Filed: May 3, 2024

(65) Prior Publication Data

US 2024/0366459 A1 Nov. 7, 2024

Related U.S. Application Data

(60) Provisional application No. 63/463,857, filed on May 3, 2023.

(51) Int. Cl.
*A61H 3/02* (2006.01)
*A45B 7/00* (2006.01)
*A45B 9/00* (2006.01)
*A45B 9/02* (2006.01)
*A45B 9/04* (2006.01)

(52) U.S. Cl.
CPC ............... *A61H 3/02* (2013.01); *A45B 7/005* (2013.01); *A45B 9/02* (2013.01); *A45B 9/04* (2013.01); *A45B 2009/005* (2013.01); *A45B 2200/05* (2013.01); *A61H 2201/0153* (2013.01); *A61H 2203/0406* (2013.01)

(58) Field of Classification Search
CPC .................................. A45B 7/005; A45B 7/00
See application file for complete search history.

(56) References Cited

U.S. PATENT DOCUMENTS 2,388,778 A * 11/1945 Wheeler .................. A61H 3/02 135/68
2,568,654 A * 9/1951 Neptune .................. A61H 3/02 135/69

(Continued)

FOREIGN PATENT DOCUMENTS

CA 2651682 A1 * 7/2010 ............... A61H 3/02
DE 202009005759 U1 * 8/2009 ............. A45B 7/005

(Continued)

*Primary Examiner* — David R Dunn
*Assistant Examiner* — Danielle Jackson
(74) *Attorney, Agent, or Firm* — Lucas R. Yordy; Jacob W. Neu; Bradley Arant Boult Cummings LLP

(57) ABSTRACT

Disclosed herein is an orthopedic device and methods to aid in reducing weight or pressure on a portion of a subject's knee while maintaining stability and normal gait patterns following injury or surgery. Certain embodiments include a main shaft for use in an orthopedic device, wherein the main shaft includes a curved portion. In embodiments, the curved portion cures outwardly in the walking direction. The curvature can comprise a curvature that is consistent with the maximum knee flexion angle that is observed during the loading phase of the normal gait cycle. In embodiments, the device further comprises a handle portion and a foot, wherein the main shaft is disposed between the handle portion and the foot. Additional aspects include a method of promoting the healing or recovery in a subject following injury or surgery of the knee using any one or more of the orthopedic devices disclosed herein.

14 Claims, 14 Drawing Sheets

(56) References Cited

U.S. PATENT DOCUMENTS

| | | | | | |
|---|---|---|---|---|---|
| D204,849 | S * | 5/1966 | Thomas et al. | D3/8 | |
| 4,787,405 | A * | 11/1988 | Karwoski | A45B 9/00 | 135/65 |
| 5,495,867 | A * | 3/1996 | Block | A61H 3/04 | 135/65 |
| 5,505,492 | A * | 4/1996 | Nelson | A63C 11/22 | 428/36.1 |
| 5,534,203 | A * | 7/1996 | Nelson | A63B 53/12 | 264/257 |
| 6,378,541 | B1 * | 4/2002 | Matthews | A61H 3/02 | 135/73 |
| 6,851,438 | B2 * | 2/2005 | Battiston | A61H 3/02 | 135/69 |
| 7,087,002 | B2 | 8/2006 | Montgomery | | |
| D539,523 | S * | 4/2007 | Wu | D3/7 | |
| 7,637,273 | B1 * | 12/2009 | Lisenby | A45B 9/00 | 135/66 |
| D747,867 | S * | 1/2016 | Woodall | D3/7 | |
| 9,763,848 | B1 * | 9/2017 | Handzic | A45B 9/04 | |
| 11,350,711 | B1 * | 6/2022 | Selman | A45B 9/00 | |
| 2006/0254633 | A1 * | 11/2006 | Willis | A45B 9/00 | 135/65 |
| 2007/0120352 | A1 * | 5/2007 | Panizza | A63C 11/22 | 280/819 |
| 2012/0318313 | A1 * | 12/2012 | Dickerson | A45B 9/02 | 16/422 |
| 2013/0192651 | A1 * | 8/2013 | Goldman | A45B 9/02 | 135/65 |
| 2016/0058140 | A1 * | 3/2016 | Woodall | A45B 9/04 | 135/82 |
| 2016/0255926 | A1 * | 9/2016 | Jung | A45B 9/00 | |
| 2019/0016427 | A1 * | 1/2019 | Charles | A63C 17/26 | |
| 2020/0352289 | A1 * | 11/2020 | Demeo | A45B 7/005 | |
| 2021/0346226 | A1 * | 11/2021 | Harris | A63B 69/0057 | |

FOREIGN PATENT DOCUMENTS

| | | | | |
|---|---|---|---|---|
| FR | 3136339 | A1 * | 12/2023 | A45B 5/00 |
| JP | 6786132 | B1 | 11/2020 | |
| KR | 20110122591 | A * | 11/2011 | |
| KR | 10-1993557 | B1 | 6/2019 | |
| WO | WO-2005087329 | A1 * | 9/2005 | A45B 9/00 |

* cited by examiner

ORTHOPEDIC DEVICE

FIELD OF THE INVENTION

This application claims the benefit of the filing of U.S. Provisional Patent Application No. 63/463,857 filed on May 3, 2023, which is incorporated by reference herein.

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described and claimed herein.

This patent disclosure contains material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

FIELD OF THE INVENTION

The present disclosure relates to orthopedic devices and related methods of use. More specifically, the present disclosure relates to devices and methods to alleviate detrimental changes in gait patterns that are frequently observed following surgery or injury.

BACKGROUND OF THE INVENTION

Treatment of and recovery from orthopedic injuries or orthopedic procedures such as knee surgery present significant medical challenges, particularly in light of changes in a subject's gait that can be observed following the injury or procedure.

Of particular importance are the effects of the injury or procedure on the "loading response" phase of a subject's gait cycle. Briefly, the loading response phase occurs at the point in the gait cycle when the heel of the leading foot touches the ground, and the weight of the body begins to shift to a single leg. As this phase progresses, the leading foot rocks forward along the heel, and the foot flattens to make full contact with the ground, allowing for a wide base of support. During a normal gait cycle, the knee on the leading foot flexes to a certain degree to absorb the shock of impact as weight is shifted to the leading leg. As such, the loading response phase is critical for establishing a stable base of support and preparing the body for the propulsion phase of the gait cycle.

Pain or mechanical instability following a knee injury or a medical procedure involving the knee often disrupts this important phase. Namely, subjects suffering from such a condition tend to exhibit reduced knee flexion during the loading response phase. For example, one study has shown that, following a knee injury, subjects can develop "quadriceps avoidance" or a "stiffening strategy" that is characterized by a knee flexion angle of under 15° during the loading response phase. See Park et al. *Knee Surgery & Related Research* (2021) 33:45. This stiffening strategy is used to reduce pain and discomfort by shifting body weight towards the unaffected leg to minimize weight on the affected leg.

However, the quadriceps avoidance gait can lead to several complications, including, but not necessarily limited to, muscle atrophy, joint stiffness, and altered gait mechanics. Such a stiffening strategy can delay healing of the injured knee and reduce blood flow to the injured area. Compensatory gait mechanics following injury can also contribute to reduced confidence and fear of reinjury, which can further delay healing and delay the individual's ability to return to their normal activities and daily life.

As such, there is a significant need for methods and devices that promote a normal gait pattern and faster healing during recovery from a knee injury.

SUMMARY OF THE INVENTION

The problems expounded above, as well as others, are addressed by the following inventions, although it is to be understood that not every embodiment of the inventions described herein will address each of the problems described above.

In one aspect, an orthopedic device for offloading weight from a subject's knee is disclosed. Certain embodiments comprise a continuous main shaft that further comprises a superior vertical extension, a curved portion, and an inferior vertical extension. In one embodiment, the curved portion is disposed between the superior vertical extension and the inferior vertical extension. The curved portion can comprise a substantially parabolic shape.

In embodiments, the superior vertical extension and the inferior vertical extension are colinear with one another along the vertical axis of the orthopedic device.

In various embodiments, the curved portion comprises a degree of curvature that is substantially equal to at least the minimum knee flexion angle that is observed during the loading phase of the normal human gait cycle. The curved portion can comprise a degree of curvature that is substantially equal to at least the maximum knee flexion angle that is observed during the loading phase of the normal gait cycle. In some embodiments, the curved portion comprises a radius of curvature of between about 10 inches and about 20 inches. The radius of curvature can be about 14 inches. In some embodiments, the curved portion comprises a longitudinal length, and the curved portion is defined by a plurality of bends along the longitudinal length of the curved portion. At least one of the plurality of bends has an angle of between about 20° to about 25°. In one embodiment, at least one of the plurality of bends is a 22° bend that has an angle of about 22°. The 22° bend can comprise a plurality of minor angular changes. At least one of the plurality of minor angular changes can comprise an angle of about 7.33°. In an embodiment, the plurality of minor angular changes comprises at least six minor angular changes.

In various embodiments, the orthopedic device further comprises a handle portion, a foot, or a combination thereof, wherein the handle portion is disposed along at least a portion of the superior vertical extension and the foot is disposed along the bottommost portion of the inferior vertical extension. The handle portion can comprise a grip and a handle shaft. In embodiments, the handle shaft further comprises one or more adjustment positions that are configured to permit adjustment of the longitudinal length of the orthopedic device along its vertical axis.

Another aspect of the present disclosure relates to a method of off-loading weight from a subject's knee wherein the subject is afflicted with a knee condition. In various embodiments, the method comprises providing the subject with any of the orthopedic device embodiments disclosed herein and instructing the subject to utilize the orthopedic device for a given amount of time.

Yet another aspect relates to a method of promoting a normal gait cycle in a subject afflicted with a knee condition, comprising providing the subject with any of the orthopedic devices disclosed herein and instructing the subject to utilize the orthopedic device for a given amount of time.

In various embodiments, the knee condition comprises an anterior cruciate ligament injury, a medial collateral ligament injury, a meniscus tear, patellar tendinitis, chondromalacia patellae, osteoarthritis of the knee, rheumatoid arthritis of the knee, bursitis, patellofemoral pain syndrome, iliotibial band syndrome, a surgical procedure involving the knee, an infection of the knee, or a combination thereof.

Other objects and advantages of this invention will become readily apparent from the ensuing description.

BRIEF DESCRIPTION OF THE FIGURES

Certain illustrations, charts, or flow charts are provided to allow for a better understanding of the present invention. It is to be noted, however, that the drawings illustrate only selected embodiments and are therefore not to be considered limiting of scope. Additional and equally effective embodiments and applications of the present invention exist.

DETAILED DESCRIPTION OF THE INVENTION

Abbreviations and Definitions

Figure 1A:
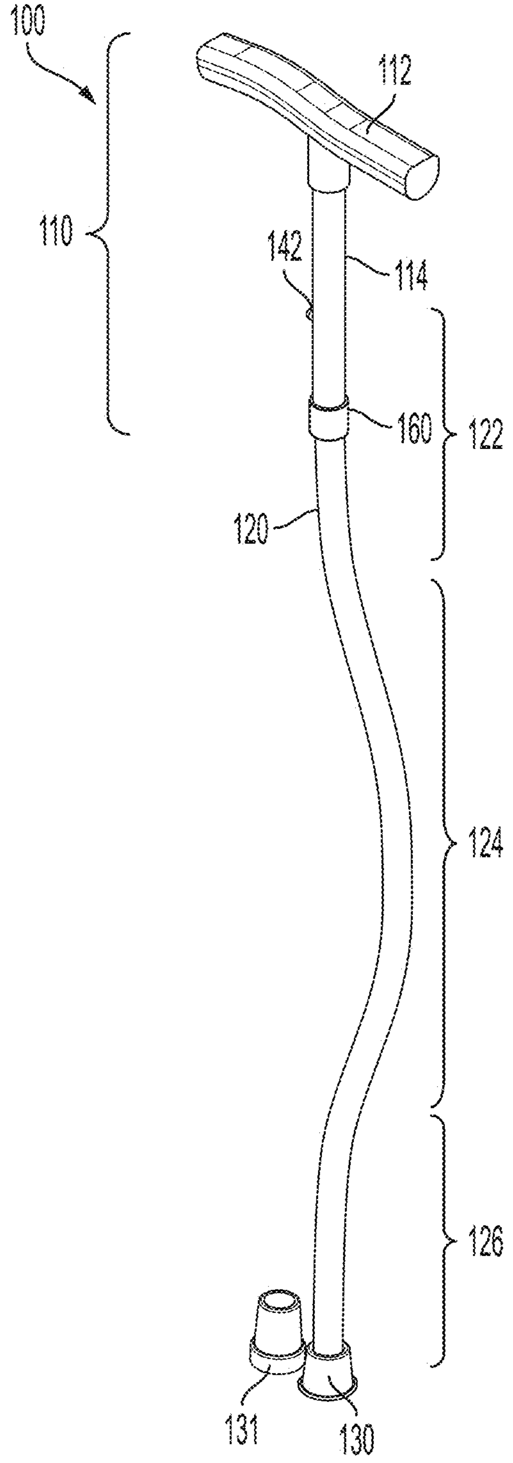
FIG. 1A shows a top, front perspective view of an orthopedic device in one embodiment.

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate manner.

The singular forms “a”, “an” and “the” include plural reference unless the context clearly dictates otherwise. The use of the word “a” or “an” when used in conjunction with the term “comprising” in the claims and/or the specification may mean “one,” but it is also consistent with the meaning of “one or more,” “at least one,” and “one or more than one.”

Wherever any of the phrases “for example,” “such as,” “including” and the like are used herein, the phrase “and without limitation” is understood to follow unless explicitly stated otherwise. Similarly, “an example,” “exemplary” and the like are understood to be nonlimiting.

The term “substantially” allows for deviations from the descriptor that do not negatively impact the intended purpose. Descriptive terms are understood to be modified by the term “substantially” even if the word “substantially” is not explicitly recited. Therefore, for example, the phrase “wherein the lever extends vertically” means “wherein the lever extends substantially vertically” so long as a precise vertical arrangement is not necessary for the lever to perform its function.

The terms “comprising” and “including” and “having” and “involving” (and similarly “comprises”, “includes,” “has,” and “involves”) and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a process involving steps a, b, and c" means that the process includes at least steps a, b, and c. Wherever the terms "a" or "an" are used, "one or more" is understood, unless such interpretation is nonsensical in context.

As used herein the term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower)

For purposes of the present disclosure, it is noted that spatially relative terms, such as "up," "down," "right," "left," "beneath," "below," "lower," "above," "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device can be otherwise oriented (rotated 90 degrees or at other orientations) and the spatially relative descriptors used herein interpreted accordingly.

The terms "subject" and "patient," as used herein, can be used interchangeably and include any individual who suffers from is likely to suffer from a knee injury or knee condition.

The term "condition," whether inflicted via a surgical procedure or naturally from an environmental occurrence or genetic predisposition, as used herein can mean any wound, injury, pathology, infection, infirmity, malady, or any other ailment, particularly those affecting at least one knee of a subject. By way of non-limiting example, the presently disclosed orthopedic device can be used to assist with or promote recovery from any one or more of the following knee conditions: anterior cruciate ligament (ACL) injury, medial collateral ligament (MCL) injury, meniscus tear, patellar tendinitis, chondromalacia patellae, osteoarthritis of the knee, rheumatoid arthritis of the knee, bursitis, patellofemoral pain syndrome, iliotibial band syndrome, a surgical procedure involving the knee, and an infection of the knee.

As used herein, the phrase "injured leg" refers to the subject's leg that is afflicted with a knee condition or any other injury or condition that may be located on the leg of a subject.

Description of Selected Embodiments

Disclosed herein is an orthopedic device configured to promote normal walking gait following an injury or surgical procedure involving a subject's knee. Embodiments of the present disclosure provide ongoing and continuous support to a subject while avoiding the deleterious effects of compensatory gait mechanisms that are typically observed in subjects suffering from a knee condition. The orthopedic device disclosed herein can be configured to permit external bracing that compensates for an internal deficit of the knee in a subject who suffers from a knee condition. In embodiments, the device is configured to offload weight or pressure from a subject's injured knee while permitting the patient to ambulate with a normal working pattern to promote healing and recovery from the knee condition. Embodiments of the orthopedic device comprise a curved portion that is designed to mimic the expected maximum knee flexion angle that is typically observed during the end of the loading phase of a healthy individual's normal gait cycle.

Generally speaking, the presently disclosed orthopedic device offers the advantage of providing external bracing to address the internal deficit of an injured knee. This, in turn, facilitates early initiation of strength training and promotes a healthy, more controlled gait. In various exemplary embodiments, the presently disclosed orthopedic device allows for greater force absorption, as the curvature of the main shaft transfers impact forces from the tip, foot, or boot of the orthopedic device throughout the subject's upper body.

Figure 1B:
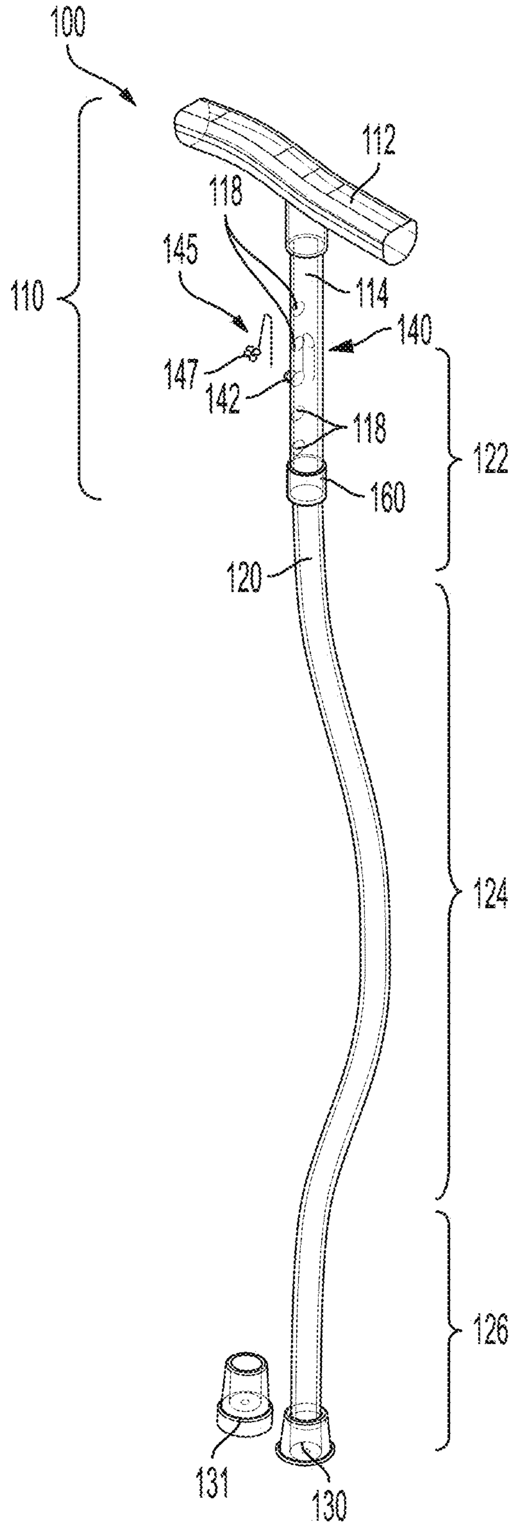
FIG. 1B provides a top perspective view of the FIG. 1A embodiment, wherein the walls of the device are shown in phantom.

FIGS. 1A and 1B show top, front perspective views of an orthopedic device in one embodiment of the present invention. Briefly, FIG. 1A provides a schematic view with solid walls, and FIG. 1B provides the same perspective view but with phantom walls to reveal certain exemplary inner workings of the orthopedic device 100.

As shown in FIGS. 1A and 1B, the orthopedic device 100 can be a cane that comprises any one or more of a handle portion 110, a main shaft 120, and a boot or foot 130. In the embodiment of FIGS. 1A and 1B, the handle portion 110 comprises a grip 112 and a handle shaft 114 that extends in a direction, such as a downward direction, that is substantially orthogonal to that of the grip 112. As can be seen, when so oriented, the handle portion 110 comprises a substantially T-shaped structure, wherein the handle shaft 114 forms the stem of the T and the grip 112 forms the crossbar of the T. The T-shape can be slightly offset such that the handle shaft 114 is not directly in the middle of the grip 112. Alternatively, the handle shaft 114 can extend substantially orthogonally from a middle portion of the grip 112. The handle 110 can also comprise a locking collar or locking collet 160, which can be configured to reversibly and securely attach the handle portion 110 to the main shaft 120 of the orthopedic device 100. In some embodiments, the handle may be curved and/or shaped to ergonomically fit to the hand of a user (such as with grooves or ridges shaped to align with the fingers of a user).

The main shaft 120 can comprise three sections. In the pictured embodiment, the main shaft 120 comprises a superior vertical extension 122, a curved portion 124, an inferior vertical extension 126, or a combination thereof. The curved portion 124 can comprise a generally parabolic shape such that the curvature extends outward in the walking direction until reaching an apex at the foremost location and then returning to the same longitudinal plane. When so configured, the superior vertical extension 122 and the inferior vertical extension 126 are substantially colinear with one another. As shown the main shaft 120 can have only a single curved portion 124.

As can be seen, the superior vertical extension 122 can comprise a section at the uppermost point of the main shaft 120 that extends substantially vertically with little to no curvature therein. Similarly, the inferior vertical extension 126 can comprise a section at the lowermost point of the main shaft 120 that extends substantially vertically with little to no curvature therein. In embodiments, the curved portion 124 is disposed along the main shaft 120 between the superior vertical extension 122 and the inferior vertical extension 126. In embodiments, the curved portion 124 can be substantially centrally disposed between the superior vertical extension 122 and the inferior vertical extension 126. In such embodiments, the superior vertical extension 122 and the inferior vertical extension 126 can be about the same longitudinal length. In certain embodiments, the curved portion 124 can be disposed along the body of the main shaft 120 in a manner that places the curved portion closer to the top of the superior vertical extension 122. In such embodiments, the longitudinal length of the superior vertical extension 122 can be less than the longitudinal length of the inferior vertical extension 126. In an alternate embodiment, the curved portion 124 can be disposed along the body of the main shaft 120 in a manner that places the curved portion 124 closer to the inferior vertical extension 126. In such exemplary embodiments, the longitudinal length of the inferior vertical extension 126 can be less than that of the superior vertical extension 122.

Figure 2A:
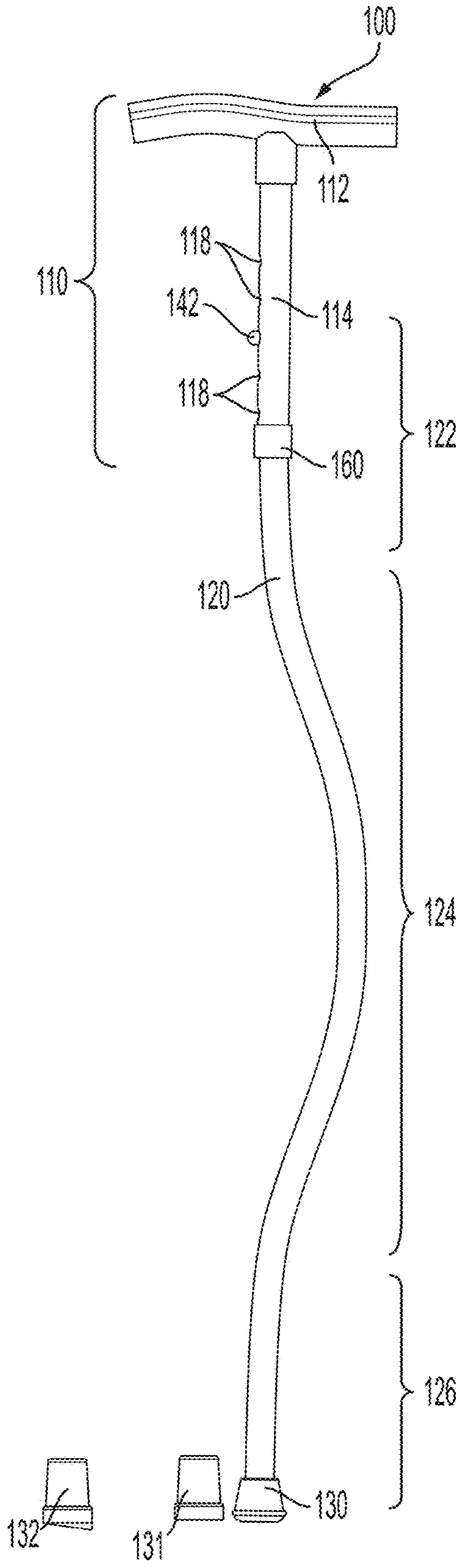
FIG. 2A shows a left-side view of the FIG. 1A embodiment.
Figure 2B:
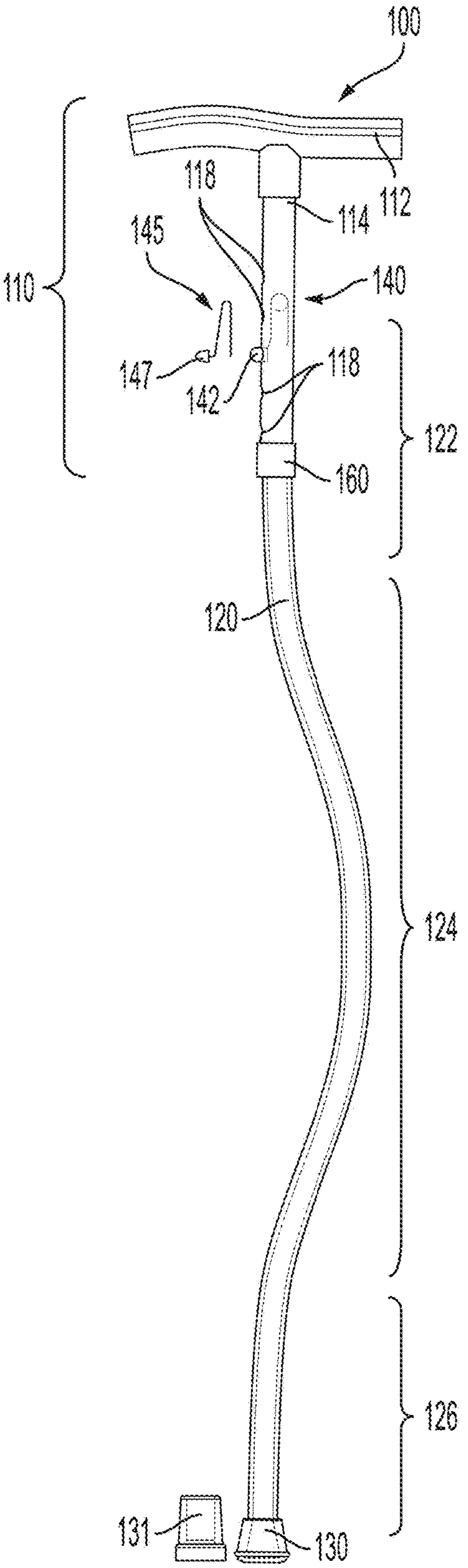
FIG. 2B shows the left-side view of FIG. 2A, wherein the walls of the device are shown in phantom.

As most clearly shown in FIGS. 1B and 2B, at least a portion of the superior vertical extension 122 can be dimensioned to reside within at least a portion of the handle shaft 114. In one embodiment, the superior vertical extension 122 comprises an outer diameter that is less than that of the inner diameter of the handle shaft 114 such that the superior vertical extension 122 can fit within the confines of the handle shaft 114. In embodiments, the locking collet or locking collar 160 is configured to reversibly secure the main shaft 120 to the handle portion 110. In one embodiment, the locking collar 160 comprises a plurality of threads that are configured to cooperatively engage and release a second plurality threads. In one embodiment, the second plurality of threads is disposed upon the superior vertical extension 122 of the main shaft to permit the handle portion 110 to be securely attached to the main shaft 120 of the orthopedic device 100.

As can be seen in FIGS. 1A and 1B, the inferior vertical extension 126 can terminate at the base of the main shaft 120, and a boot or foot 130 can be placed thereon. The orthopedic device 100 is shown with a boot or foot 130 under a first embodiment attached thereto. A second embodiment of the boot or foot 131 is shown adjacent to the orthopedic device 100 as a non-limiting example of an alternate configuration. As pictured, the alternate configuration of the boot or foot 131 comprises a taller sidewall as compared to the boot or foot 130 under the first embodiment. In embodiments, the boot or foot 130, 131 can be frictionally attached to the bottom-most portion of the inferior vertical extension 126. In alternate embodiments, the boot or foot 130, 131 can be glued, adhered, or otherwise joined to the main shaft 120. In embodiments, the boot or foot 130, 131 is integral with the main shaft 120. As will be understood by one of skill in the art, the second embodiment of the boot or foot 131 is shown adjacent to the orthopedic device throughout the drawings merely as an exemplary reference of an alternative embodiment and can be used in place of (as opposed to in addition to) the first embodiment of the boot or foot 130. As such, to the extent that the drawings suggest that both the first embodiment and the second embodiment of the boot or foot 130, 131 are required, such a suggestion is expressly renounced.

The orthopedic device 100 can comprise a mechanism or means for adjusting the height of the device. As shown in FIG. 1B, in one embodiment the mechanism or means for adjusting the height of the device comprises a push-button spring clip 140 that interacts with one or more height adjustment positions 118 disposed within or on the handle shaft 114 and at least one spring retention hole (more clearly shown at 128 of FIG. 6) disposed within the superior vertical extension 122 of the main shaft 120. The push-button spring clip 140 can comprise any shape or configuration that may be known in the art. By way of non-limiting example, and as more fully discussed with reference to FIGS. 11 and 12, the push-button spring clip can comprise a coiled spring structure 140 or, in the alternative, a non-coiled spring structure 145. In either embodiment, and as more fully discussed below, the push-button spring clip 140, 145 comprises a button or cap 142, 147 that can be depressed to reversibly change the height or longitudinal length of the orthopedic device 100.

As will be understood by one of skill in the art, the second embodiment of the push-button spring clip 145 is shown adjacent to the orthopedic device 100 throughout the drawings merely as an exemplary reference of an alternative embodiment and can be used in place of (as opposed to in addition to) the first embodiment of the push-button spring clip 140. As such, to the extent that the drawings suggest that both the first embodiment and the second embodiment of the push-button spring clip 140, 145 are required, such a suggestion is expressly renounced.

FIGS. 2A and 2B show side views of the FIG. 1A embodiment. Briefly, FIG. 2A provides a schematic view with solid walls, and FIG. 2B provides the same perspective view but with phantom walls to reveal certain exemplary inner workings of the orthopedic device 100. This view more clearly shows the interactions of the push-button spring clip 140, 145 with the one or more height adjustment positions 118 disposed within or on the handle shaft 114 and at least one spring retention hole (more clearly shown at 128 of FIG. 6). This view also shows the full curvature of the curved portion 124 of the main shaft 120. In FIG. 2A, a third embodiment of the boot or foot 132 is shown adjacent to the orthopedic device 100 as a non-limiting example of an alternate configuration. As pictured, this third alternate configuration of the boot or foot 132 comprises a taller sidewall as compared to the boot or foot 130 under the first embodiment and also includes a beveled or angled bottom. In some embodiments, the boot or foot 132 of the third alternate configuration may be angled such that the front is lower than the back. In other words, if the orthopedic device 100 were disposed such that the angled bottom face of the boot or foot 132 were flush with the ground, the orthopedic device 100 would lean rearwardly.

In embodiments, the boot or foot 132 can be frictionally attached to the bottom-most portion of the inferior vertical extension 126. In alternate embodiments, the boot or foot 132 can be glued, adhered, or otherwise joined to the main shaft 120. In embodiments, the boot or foot 132 is integral with the main shaft 120. As will be understood by one of skill in the art, the third embodiment of the boot or foot 132 is shown adjacent to the orthopedic device in FIG. 2A merely as an exemplary reference of an alternative embodiment and can be used in place of (as opposed to in addition to) the first embodiment of the boot or foot 130 or the second embodiment of the boot or foot 131. As such, to the extent that the drawings suggest that both the first embodiment, the second embodiment, and the third embodiment of the boot or foot 130, 131, 132 are required, such a suggestion is expressly renounced.

Figure 3A:
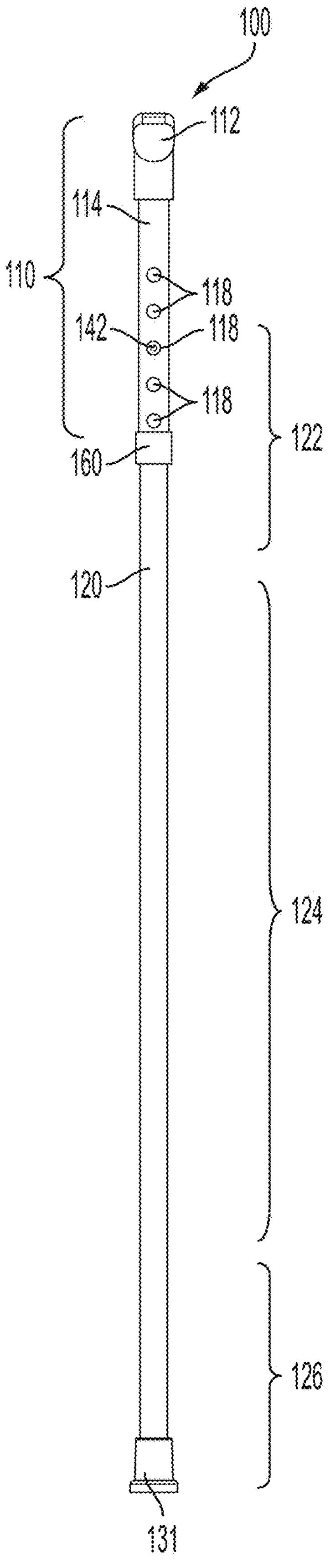
FIG. 3A shows a back view of the FIG. 1A embodiment.

FIG. 3A shows a back view of the FIG. 1A embodiment. During use of the orthopedic cane, the back face of the cane shown in FIG. 3A will be facing the user under one embodiment. In this view, five height adjustment positions

118 are visible in the handle shaft 114 of the orthopedic device 100. As can be seen in this view, the button or cap 142 of the push-button spring clip (not visible) is extending through the 3rd height adjustment position 118 from the top. The curved portion 124 of the orthopedic device 100 is present, but not visible due to the view being in substantially the same plane as the curvature of the curved portion 124.

Figure 3B:
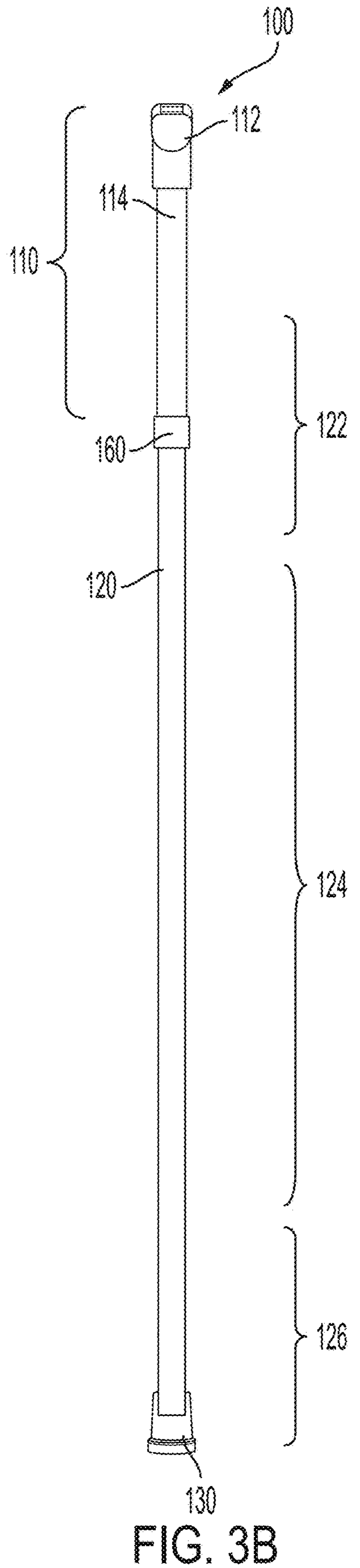
FIG. 3B shows a front view of the FIG. 1A embodiment.

FIG. 3B shows a front view of the FIG. 1A embodiment. As shown in this particular embodiment, during use of the pictured orthopedic device 100, the front face will be facing away from the user. Once again, the curved portion 124 of the orthopedic device 100 is present, but not visible due to the view being in substantially the same plane as the curvature of the curved portion 124.

Figure 4:
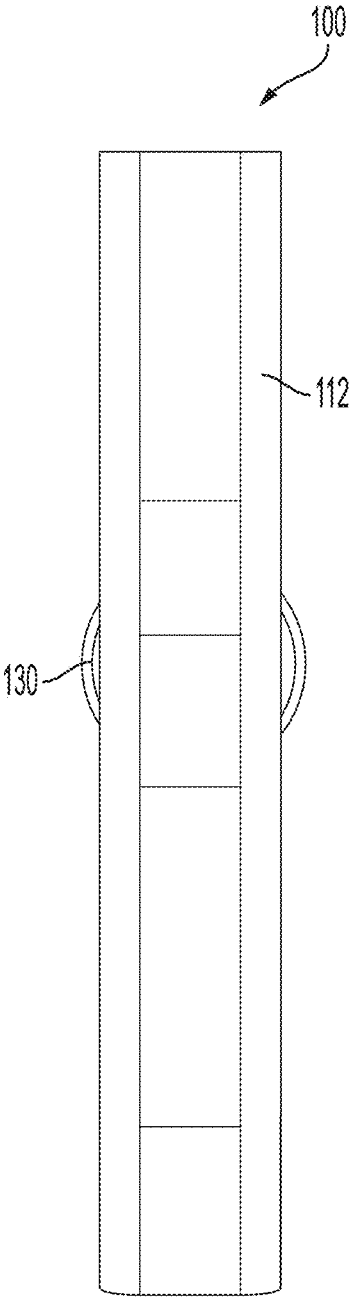
FIG. 4 provides a top view of the FIG. 1A embodiment.

FIG. 4 provides a top view of the FIG. 1A embodiment. This view is taken from above the orthopedic device 100 looking directly down. The top surface of the grip 112 can be seen and the side surfaces of the boot or foot 130 are shown.

Figure 5:
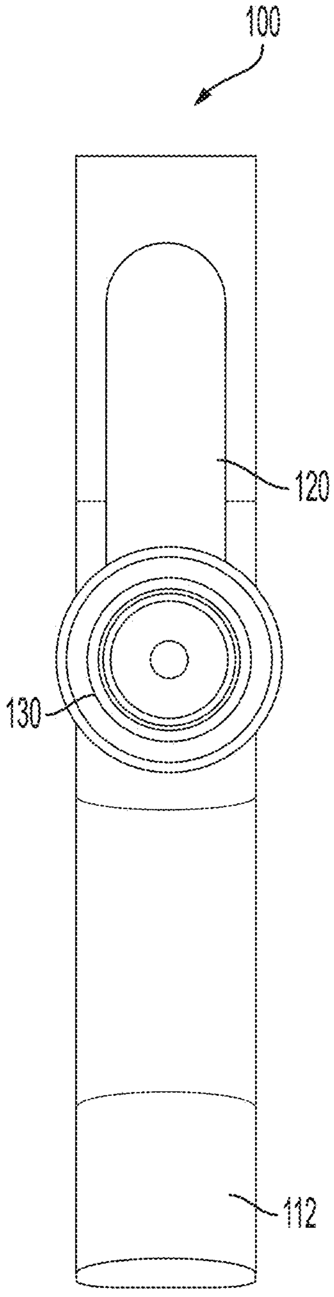
FIG. 5 provides a bottom view of the FIG. 1A embodiment.

FIG. 5 provides a bottom view of the FIG. 1A embodiment. This view is taken from directly below the orthopedic device 100 looking up. The bottom surface of the boot or foot 130 can be seen. The bottom surface of the grip 112 is also shown in this view. As pictured, the bottom part of the curved portion 124 of the main shaft 120 is shown extending toward the front of the orthopedic device 100.

Figure 6:
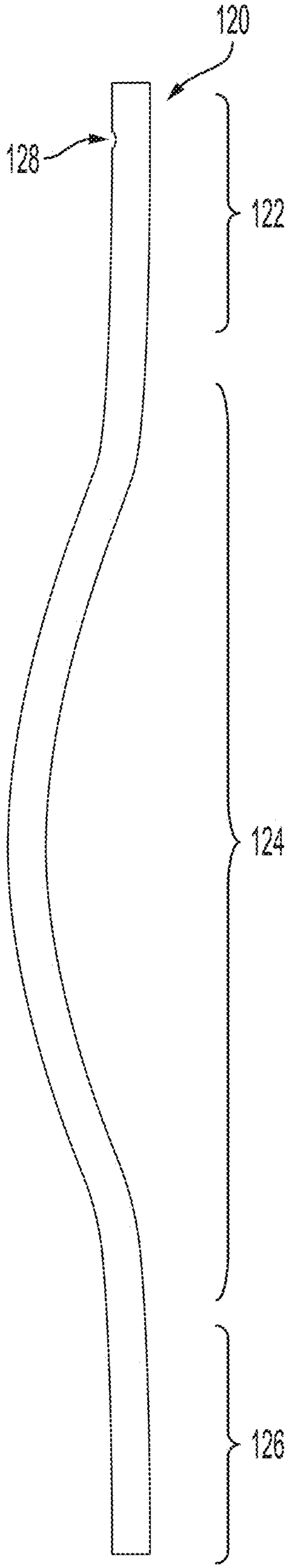
FIG. 6 shows a side view of the main shaft from the FIG. 1A embodiment.

FIG. 6 shows a side view of the main shaft from the FIG. 1A embodiment. In this view, at least a portion of the spring clip retention hole 128 is clearly visible in the upper part of the superior vertical extension 122 of the main shaft 120. The full curvature of the curved portion 124 is visible just below the superior vertical extension 122, and the inferior vertical extension 126 can be seen just below the curved portion 124 of the main shaft 120.

Figure 7:
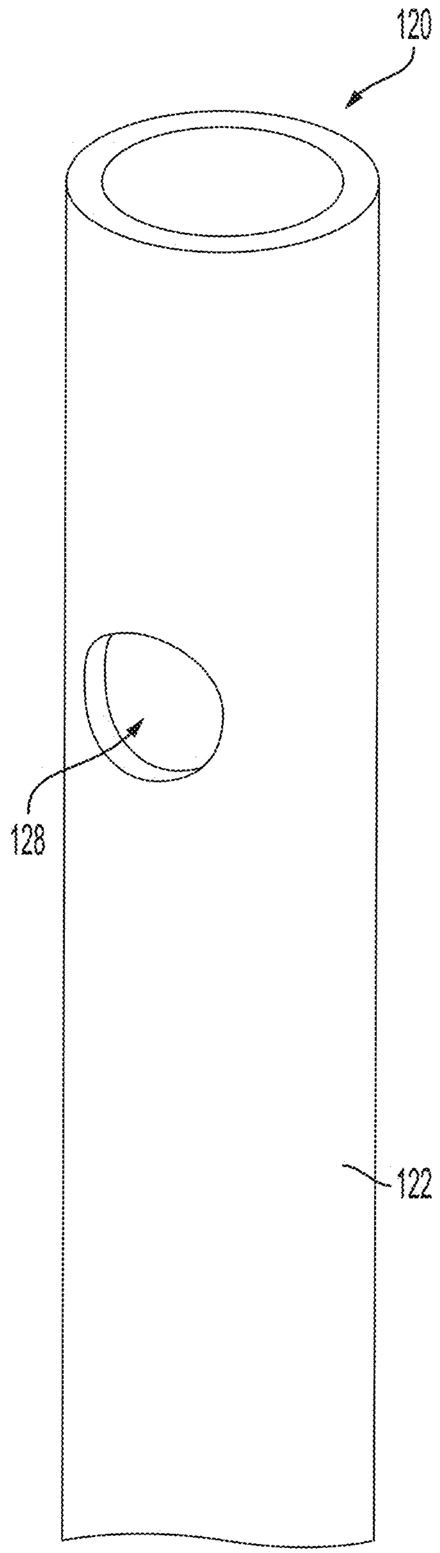
FIG. 7 provides a detailed view of the superior vertical extension of the main shaft. A spring clip receiving hole can be seen through the wall of the main shaft.

FIG. 7 provides a detailed view of the superior vertical extension 122 of the main shaft 120. The spring-clip retention hole 128 can be seen through the wall of the main shaft 120.

Figure 8A:
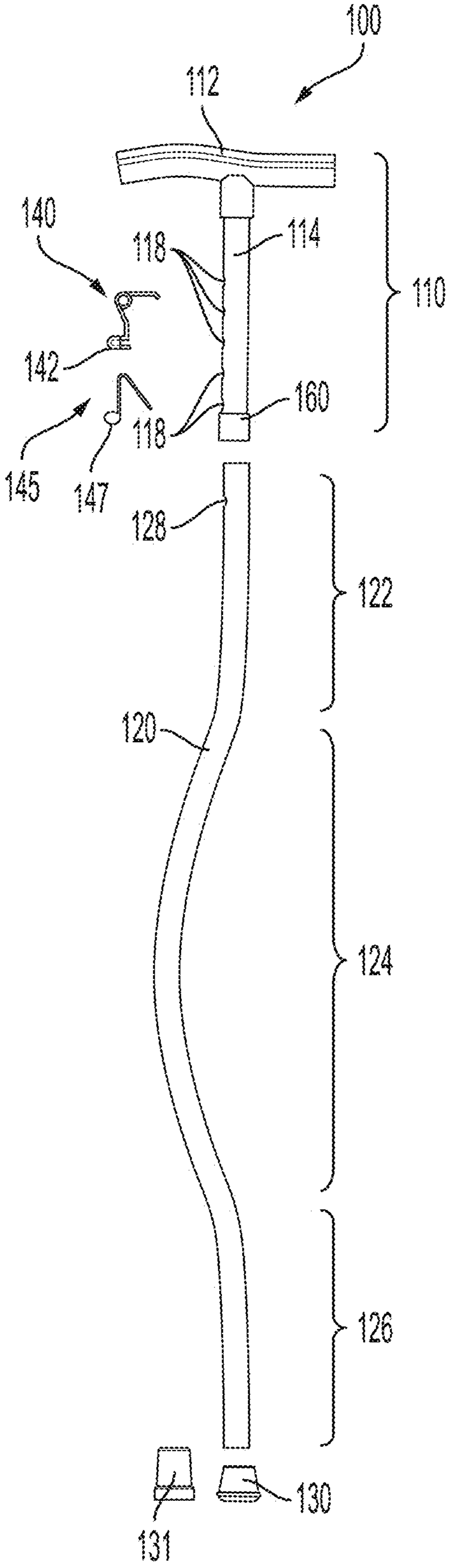
FIG. 8A shows an exploded side view of the orthopedic device shown in the FIG. 1A embodiment.

FIG. 8A shows an exploded side view of the orthopedic device shown in the FIG. 1A embodiment. This view shows how the separate components of the orthopedic device 100 can be oriented together. The handle portion 110 is shown above the main shaft 120 and the boot or foot 130 is shown below the inferior vertical extension 126 of the main shaft. In addition, two alternate variations of the push-button spring clip 140, 145 are shown next to the handle shaft 114, each with a different button or cap 142, 147.

Figure 8B:
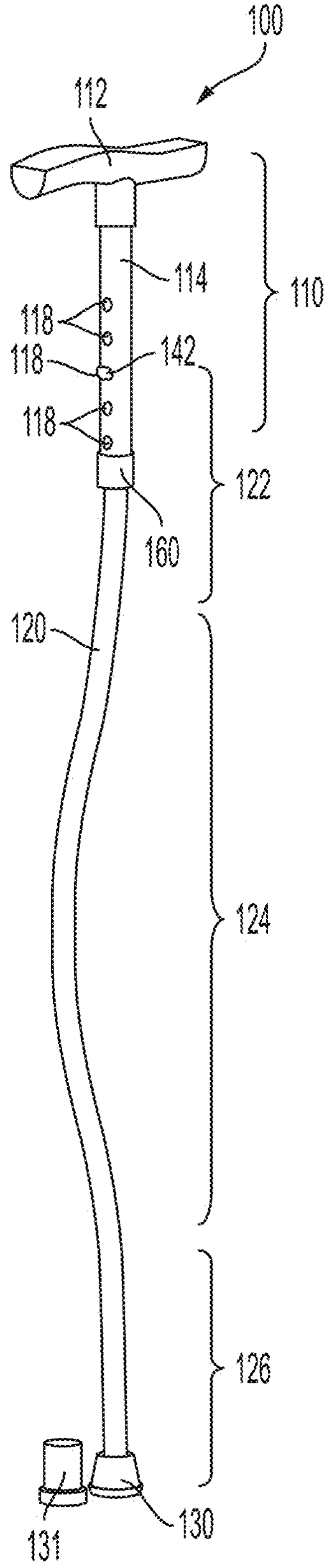
FIG. 8B provides a top, back, perspective view of the FIG. 1A embodiment.

FIG. 8B provides a top, back, perspective view of the orthopedic device 100 shown in FIG. 1A. In this view, five height adjustment positions 118 are visible in the handle shaft 114 of the orthopedic device 100. As can be seen in this view, the button or cap 142 of the push-button spring clip (not visible) extends through the 3rd height adjustment position 118 from the top.

Figure 9A:
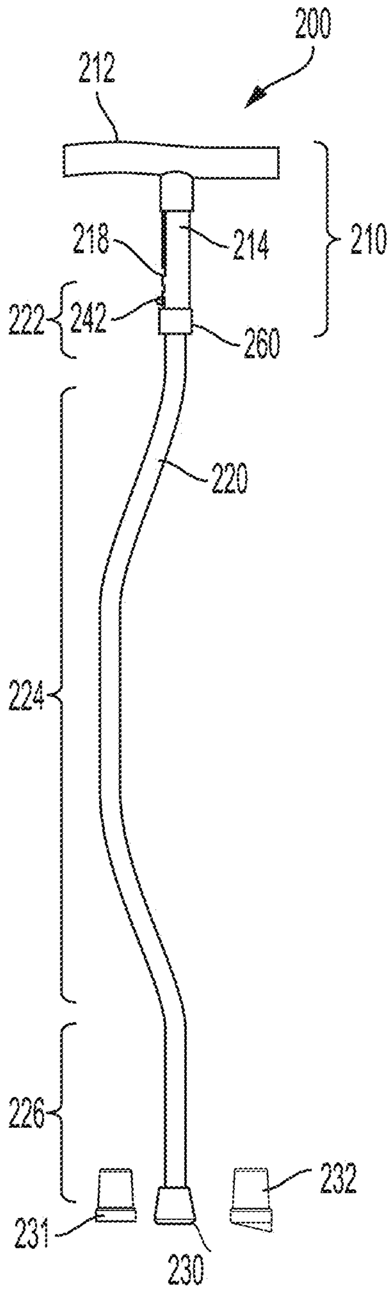
FIG. 9A shows a side view of an orthopedic device in an embodiment with a handle shaft that is shortened compared to that of FIG. 1A.
Figure 9B:
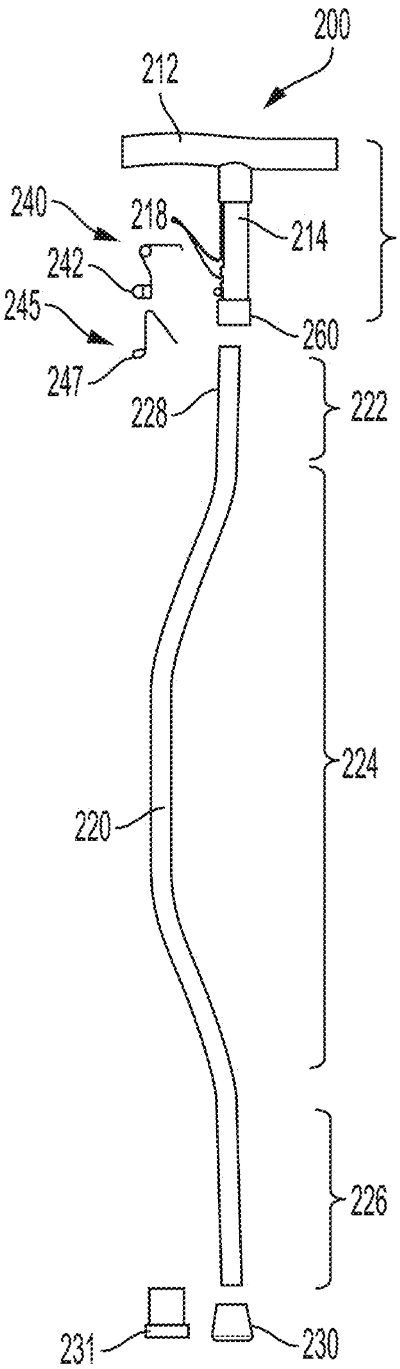
FIG. 9B shows an exploded side view of the orthopedic device shown in the FIG. 9A embodiment.
Figure 9C:
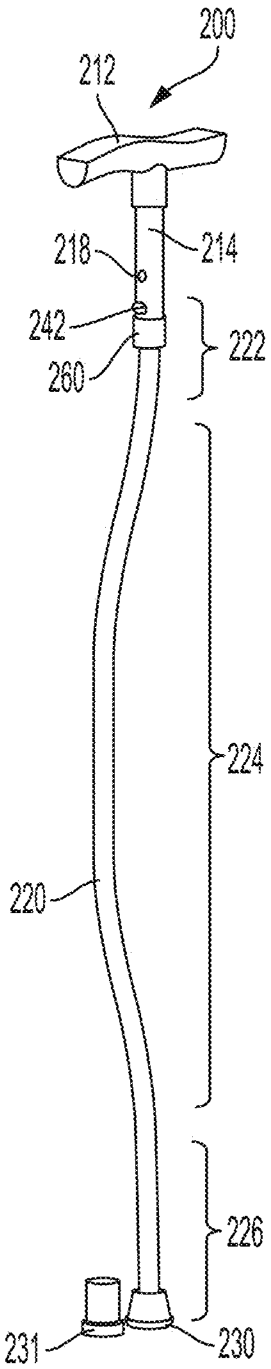
FIG. 9C provides a top, back perspective view of the FIG. 9A embodiment.

FIGS. 9A-9C provide different views of an orthopedic device 200 under a second embodiment with a handle shaft 214 that is shortened compared to that of the FIG. 1A embodiment. Briefly, FIG. 9A shows a side view of the shortened orthopedic device 200, FIG. 9B shows an exploded side view of the device 200, and FIG. 9C shows a top, back perspective view of the FIG. 9A embodiment.

As shown in FIGS. 9A-9C, the orthopedic device 200 can be a cane that comprises any one or more of a handle portion 210, a main shaft 220, and a boot or foot 230. In the embodiment of FIGS. 9A-9C, the handle portion 210 comprises a grip 212 and a handle shaft 214 that extends in a direction, such as a downward direction, that is substantially orthogonal to that of the grip 212 to comprise the substantially T-shaped structure as further described above. The handle portion 210 can also comprise a locking collar or locking collet 260, which can be configured to reversibly and securely attach the handle portion 210 to the main shaft 220 of the orthopedic device 200.

The main shaft 220 can comprise three sections. In the pictured embodiment, the main shaft 220 comprises a superior vertical extension 222, a curved portion 224, an inferior vertical extension 226, or a combination thereof. As can be seen, the superior vertical extension 222 can comprise a section at the uppermost point of the main shaft 220 that extends substantially vertically with little to no curvature therein. Similarly, the inferior vertical extension 226 can comprise a section at the lowermost point of the main shaft 220 that extends substantially vertically with little to no curvature therein. In embodiments, the curved portion 224 is disposed along the main shaft 220 between the superior vertical extension 222 and the inferior vertical extension 226. As shown in the present embodiment of the orthopedic devices 200, the curved portion 224 can be disposed along the body of the main shaft 220 in a manner that places the curved portion 224 closer to the top of the main shaft 220. In such embodiments, the longitudinal length of the superior vertical extension 222 can be less than the longitudinal length of the inferior vertical extension 226. In embodiments, the curved portion 224 can be substantially centrally disposed between the superior vertical extension 222 and the inferior vertical extension 226. In such embodiments, the superior vertical extension 222 and the inferior vertical extension 226 can be about the same longitudinal length. In an alternate embodiment, the curved portion 224 can be disposed along the body of the main shaft 220 in a manner that places the curved portion 224 closer to the base of the main shaft 220. In such exemplary embodiments, the longitudinal length of the inferior vertical extension 226 can be less than that of the superior vertical extension 222.

As can be seen in FIGS. 9A and 9B, the inferior vertical extension 226 can terminate at the base of the main shaft 220, and a boot or foot 230 can be placed thereon. The orthopedic device 200 is shown with a boot or foot 230 under a first embodiment attached thereto. A second embodiment of the boot or foot 231 is shown adjacent to the orthopedic device 200 as a non-limiting example of an alternate configuration. As pictured, the alternate configuration of the boot or foot 231 comprises a taller sidewall as compared to the boot or foot 230 under the first embodiment. In FIG. 9A, a third embodiment of the boot or foot 232 is shown adjacent to the orthopedic device 200 as a non-limiting example of an alternate configuration. As pictured, this third alternate configuration of the boot or foot 232 comprises a taller sidewall as compared to the boot or foot 230 under the first embodiment and also includes a beveled or angled bottom. In some embodiments, the boot or foot 232 of the third alternate configuration may be angled such that the front is lower than the back. In other words, if the orthopedic device 200 were disposed such that the angled bottom face of the boot or foot 232 were flush with the ground, the orthopedic device 200 would lean rearwardly.

In embodiments, the boot or foot 230, 231, 232 can be frictionally attached to the bottom-most portion of the inferior vertical extension 226. In alternate embodiments, the boot or foot 230, 231, 232 can be glued, adhered, or otherwise joined to the main shaft 220. In embodiments, the boot or foot 230, 231, 232 is integral with the main shaft 220. As will be understood by one of skill in the art, the second embodiment of the boot or foot 231 and the third embodiment of the boot or foot 232 are shown adjacent to the orthopedic device merely as an exemplary reference of an alternative embodiment and can be used in place of (as opposed to in addition to) the first embodiment of the boot or foot 230. As such, to the extent that the drawings suggest that both the first embodiment, the second embodiment, and the third embodiment of the boot or foot 230, 231, 232 are required, such a suggestion is expressly renounced.

The orthopedic device 200 can comprise a mechanism or means for adjusting the height of the device. As shown in FIG. 9B, in one embodiment the mechanism or means for adjusting the height of the device comprises a push-button spring clip 240 that interacts with one or more height adjustment positions 218 disposed within or on the handle shaft 214 and at least one spring retention hole 228 disposed within the superior vertical extension 222 of the main shaft 220. The push-button spring clip 240 can comprise any shape or configuration that may be known in the art. By way of non-limiting example, and as more fully discussed with reference to FIGS. 11 and 12, the push-button spring clip can comprise a coiled spring structure 240 or, in the alternative, a non-coiled spring structure 245. In either embodiment, and as more fully discussed below, the push-button spring clip 240, 245 comprises a button or cap 242, 247 that can be depressed to reversibly change the height or longitudinal length of the orthopedic device 200.

As will be understood by one of skill in the art, the second embodiment of the push-button spring clip 245 is shown adjacent to the orthopedic device 200 merely as an exemplary reference of an alternative embodiment and can be used in place of (as opposed to in addition to) the first embodiment of the push-button spring clip 240. As such, to the extent that the drawings suggest that both the first embodiment and the second embodiment of the push-button spring clip 240, 245 are required, such a suggestion is expressly renounced.

Figure 10A:
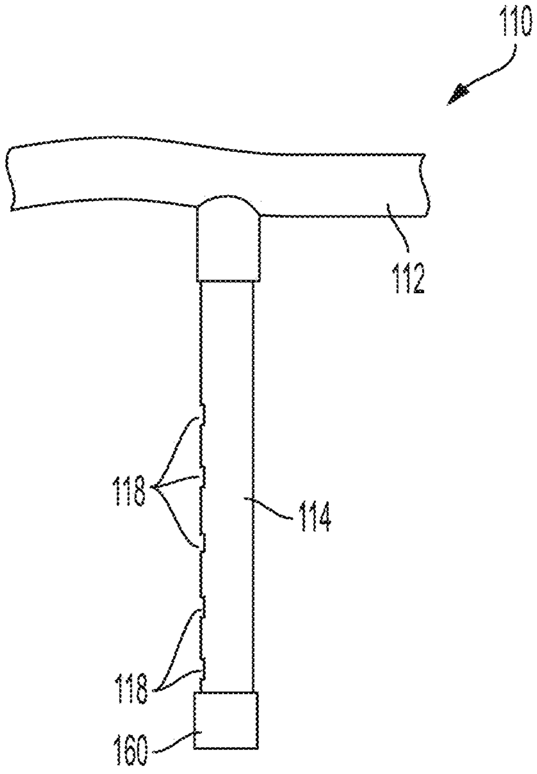
FIG. 10A shows a detailed view of the handle portion from the FIG. 1A embodiment.

FIG. 10A shows a detailed view of the handle portion 110 from the FIG. 1A embodiment. In this view, five height adjustment positions 118 are visible in the handle shaft 114 of the orthopedic device 100. The locking collet or collar 160 is shown at the base of the handle shaft 114.

Figure 10B:
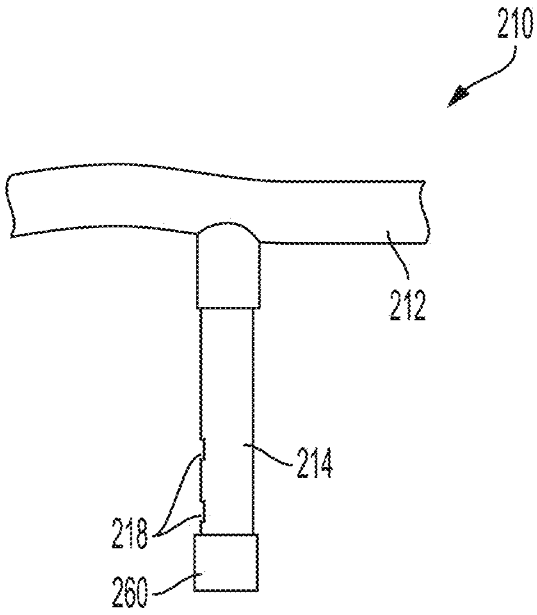
FIG. 10B shows a detailed view of the handle portion of the FIG. 9A embodiment.

FIG. 10B shows a detailed view of the handle portion 210 of the FIG. 9A embodiment. In this view, two height adjustment positions 218 are visible in the handle shaft 214 of the orthopedic device 200. The locking collet or collar 260 is shown at the base of the handle shaft 214. As can be seen, the length of the handle shaft 214 is shorter when compared to that of the handle shaft 114 in the FIG. 10A embodiment.

Figure 11A:
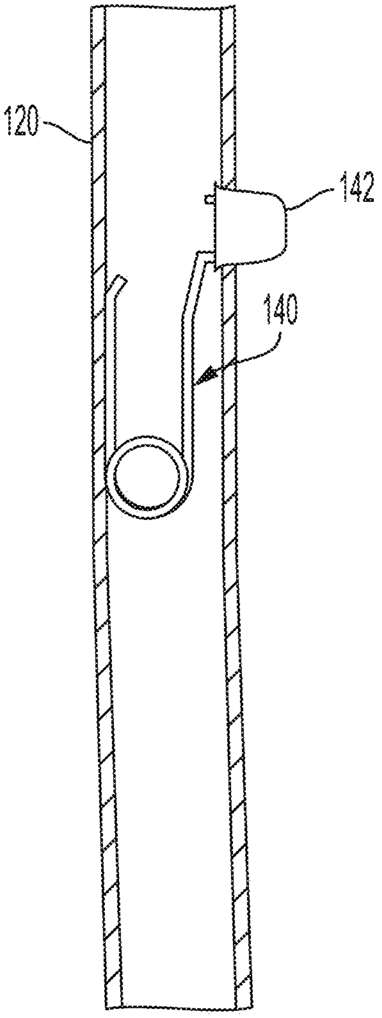
FIG. 11A shows a detailed, side and cross-sectional view of the superior vertical extension of the main shaft with a coiled push-button spring clip residing therein under one exemplary embodiment. In this embodiment, the button of the spring clip can be seen extending through the spring clip retention hole.

FIG. 11A shows a detailed, side and cross-sectional view of the superior vertical extension 122 of the main shaft 120 with a coiled push-button spring clip 140 residing therein under the first exemplary embodiment. In this embodiment, the button or cap 142 of the spring clip 140 can be seen extending through the spring clip retention hole 128 of the main shaft 120.

Figure 11B:
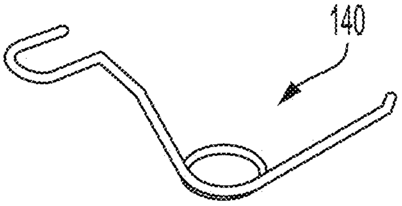
FIG. 11B shows a detailed view of the coiled spring clip under the FIG. 11A embodiment.

FIG. 11B shows a detailed view of the coiled spring clip 140 under the FIG. 11A embodiment. As can be seen, the coiled spring clip 140 comprises a coil, which serves to permit the spring clip to compress when disposed within the inner diameter of the main shaft 120 (see, for example, FIG. 11A, wherein the spring clip 140 assumes a compressed shape).

Figure 11C:
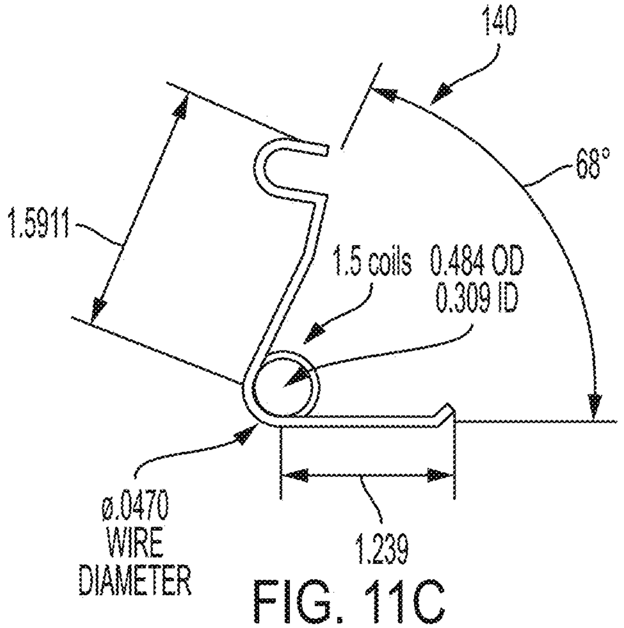
FIG. 11C provides non-limiting exemplary measurements of the coiled spring clip of FIG. 11A embodiment.

FIG. 11C provides non-limiting exemplary measurements (in inches) of the coiled spring clip 140 of FIG. 11A embodiment. It should be noted that these measurements are merely exemplary and can vary above or below the depicted value by up to 30%. In certain embodiments, the measurements vary above or below the depicted value by up to 20%, up to 15%, up to 10%, or up to 5%. The values can vary up to 1%, up to 2%, up to 3%, or up to 4%.

Figure 11D:
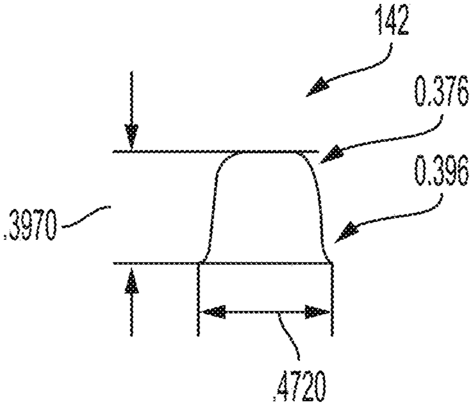
FIG. 11D provides a detailed view of an exemplary cap or button for use in the embodiment of FIG. 11A. Certain non-limiting exemplary measurements of the cap or button are also shown.

FIG. 11D provides a detailed view of an exemplary button or cap 142 for use in the embodiment of FIG. 11A. Certain non-limiting exemplary measurements of the cap or button are also shown. It should be noted that these measurements are merely exemplary and can vary above or below the depicted value by up to 30%. In certain embodiments, the measurements vary above or below the depicted value by up to 20%, up to 15%, up to 10%, or up to 5%. The values can vary up to 1%, up to 2%, up to 3%, or up to 4%.

Figure 12A:
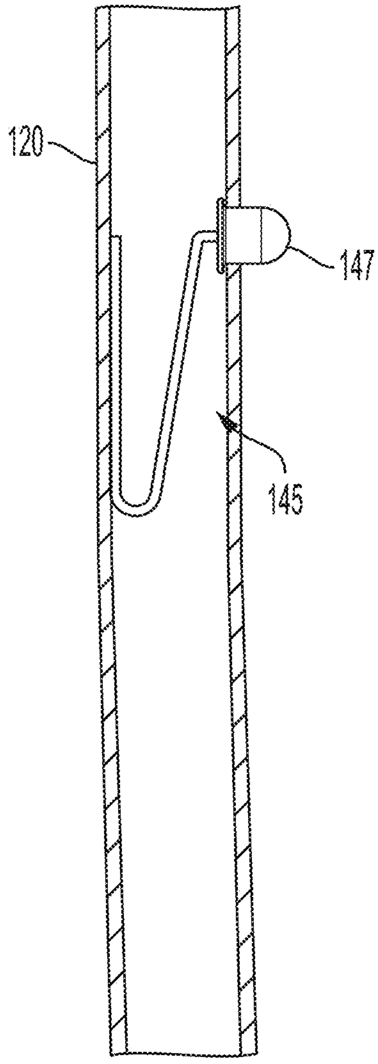
FIG. 12A shows a detailed, side and cross-sectional view of the superior vertical extension of the main shaft with a non-coiled push-button spring clip residing therein under another exemplary embodiment. In this embodiment, the button of the spring clip can be seen extending through the spring clip retention hole.

FIG. 12A shows a detailed, side and cross-sectional view of the superior vertical extension 122 of the main shaft 120 with a non-coiled push-button spring clip 145 residing therein under another exemplary embodiment. In this embodiment, the button 147 of the spring clip 145 can be seen extending through the spring clip retention hole 128.

Figure 12B:
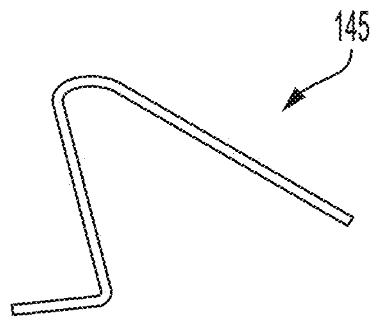
FIG. 12B shows a detailed view of the non-coiled spring clip under the FIG. 12A embodiment.

FIG. 12B shows a detailed view of the non-coiled spring clip 145 under the FIG. 12A embodiment. As can be seen, the non-coiled spring clip 145 comprises a bend at the apex, which serves to permit the spring clip to compress when disposed within the inner diameter of the main shaft 120 (see, for example, FIG. 12A, wherein the spring clip 145 assumes a compressed shape).

Figure 12C:
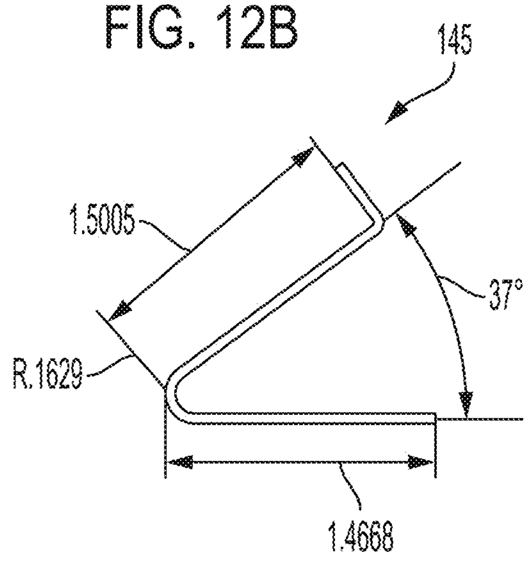
FIG. 12C provides non-limiting exemplary measurements of the non-coiled spring clip of FIG. 12A embodiment.

FIG. 12C provides non-limiting exemplary measurements of the non-coiled spring clip 145 of FIG. 12A embodiment. It should be noted that these measurements are merely exemplary and can vary above or below the depicted value by up to 30%. In certain embodiments, the measurements vary above or below the depicted value by up to 20%, up to 15%, up to 10%, or up to 5%. The values can vary up to 1%, up to 2%, up to 3%, or up to 4%.

Figure 12D:
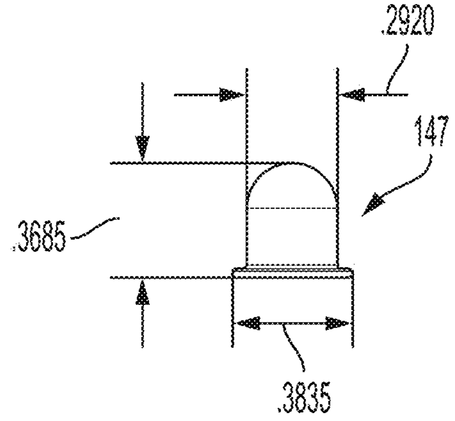
FIG. 12D provides a detailed view of an exemplary cap or button for use in the embodiment of FIG. 12A. Certain non-limiting exemplary measurements of the cap or button are also shown.

FIG. 12D provides a detailed view of an exemplary button or cap 147 for use in the embodiment of FIG. 12A. Certain non-limiting exemplary measurements of the cap or button are also shown. It should be noted that these measurements are merely exemplary and can vary above or below the depicted value by up to 30%. In certain embodiments, the measurements vary above or below the depicted value by up to 20%, up to 15%, up to 10%, or up to 5%. The values can vary up to 1%, up to 2%, up to 3%, or up to 4%.

Figure 13:
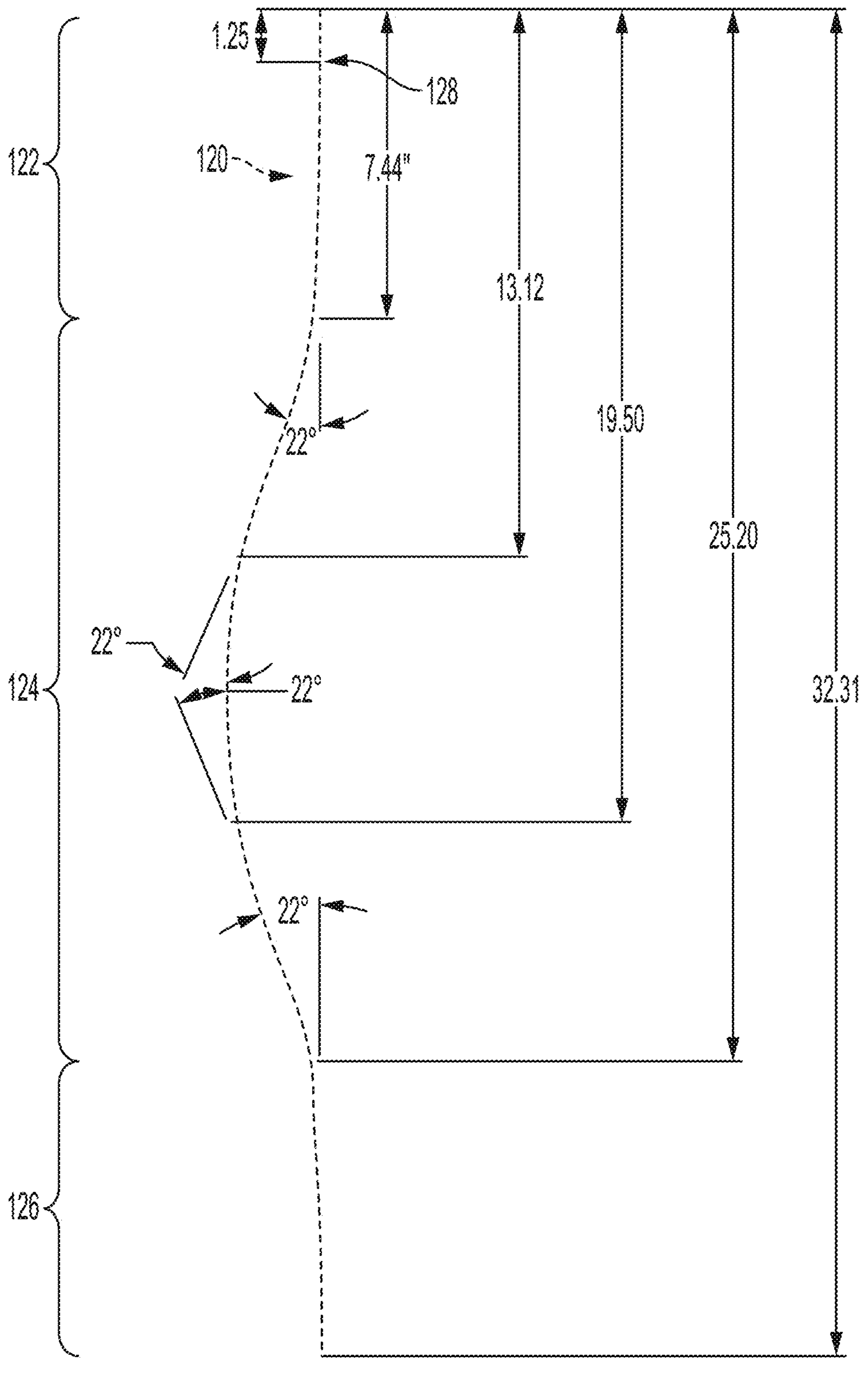
FIG. 13 shows a simplified, schematic view of the FIG. 1A embodiment with non-limiting exemplary measurements.

FIG. 13 shows a simplified, schematic view of the main shaft 120 from the FIG. 1A embodiment with non-limiting exemplary measurements. The at least one spring retention hole 128 is denoted along the superior vertical extension 122 of the main shaft 120. It should be noted that these measurements are merely exemplary and can vary above or below the depicted value by up to 30%. In certain embodiments, the measurements vary above or below the depicted value by up to 20%, up to 15%, up to 10%, or up to 5%. The values can vary up to 1%, up to 2%, up to 3%, or up to 4%.

Figure 14:
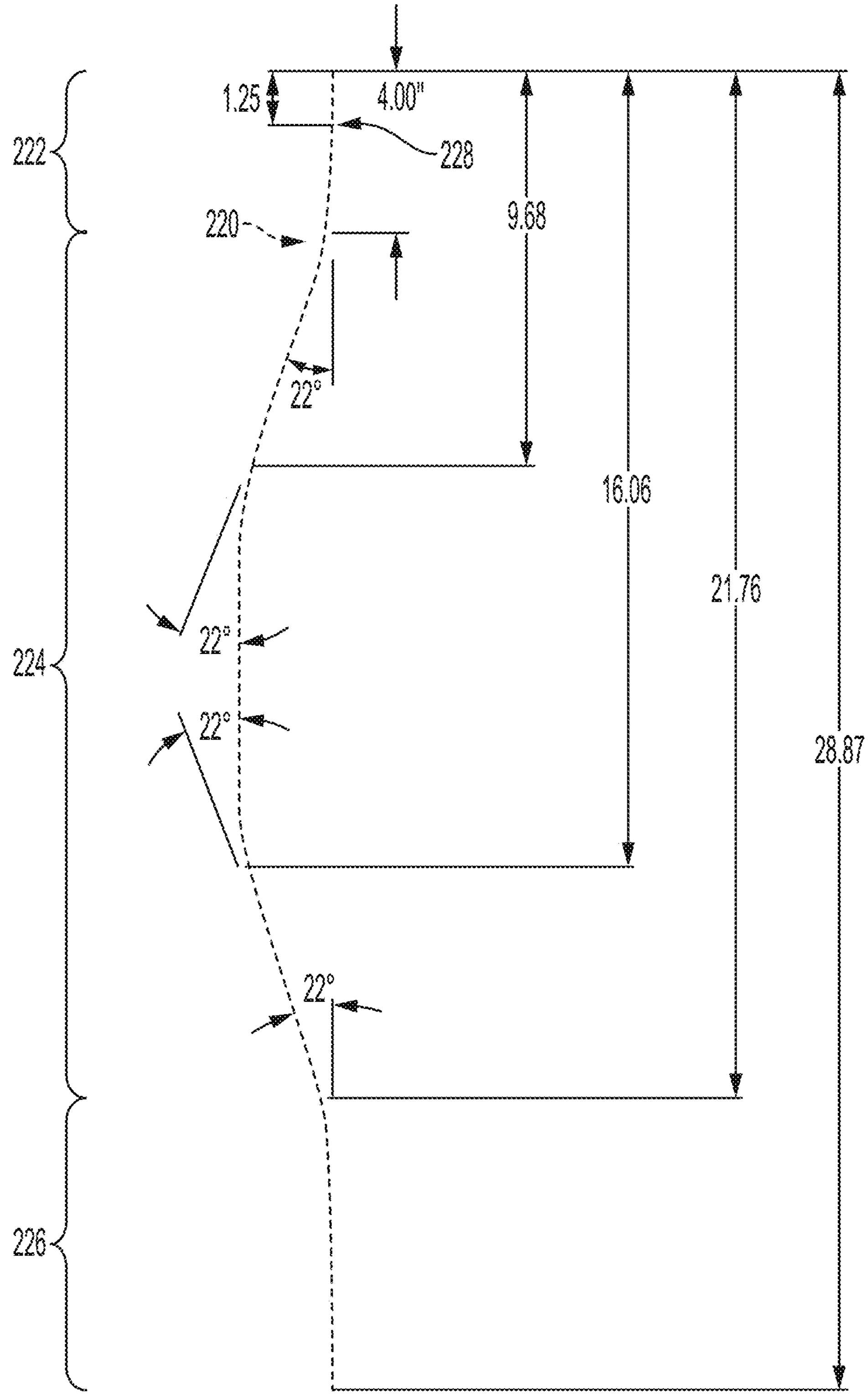
FIG. 14 shows a simplified, schematic view of the FIG. 9A embodiment with non-limiting exemplary measurements.

FIG. 14 shows a simplified, schematic view of the main shaft 220 of the FIG. 9A embodiment with non-limiting exemplary measurements. The at least one spring clip retention hole 228 is denoted along the superior vertical extension 222 of the main shaft 220. It should be noted that these measurements are merely exemplary and can vary above or below the depicted value by up to 30%. In certain embodiments, the measurements vary above or below the depicted value by up to 20%, up to 15%, up to 10%, or up to 5%. The values can vary up to 1%, up to 2%, up to 3%, or up to 4%.

Figure 15:
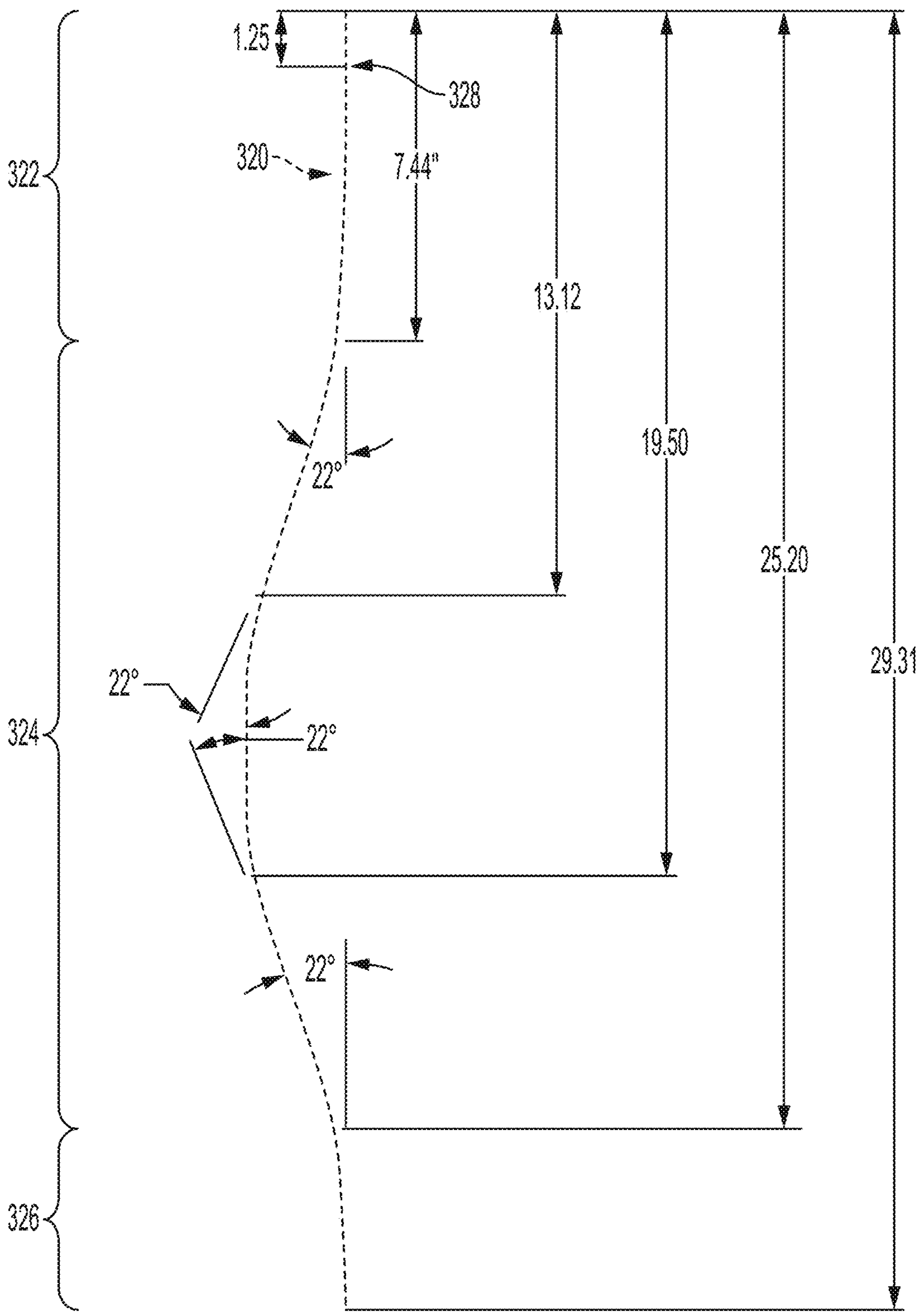
FIG. 15 shows a simplified, schematic view of the main shaft of a third exemplary embodiment with non-limiting exemplary measurements.

FIG. 15 shows a simplified, schematic view of the main shaft 320 of a third exemplary embodiment with non-limiting exemplary measurements. The at least one spring clip retention hole 328 is denoted along the superior vertical extension 322 of the main shaft 320. As can be seen, in this embodiment, the superior vertical extension 322 is extended relative to that of the inferior vertical extension 326. Briefly, as can be seen in the exemplary measurements, the longitudinal length of the superior vertical extension 322 in the FIG. 15 embodiment is about the same as that of the superior vertical extension 122 of the FIG. 13 embodiment. Thus, it will be understood by one of skill in the art that the superior vertical extension 322 can be configured for use with the handle portion 110 of the FIG. 1A embodiment. That is to say that the orthopedic device can be provided such that the handle portion 110, 210 is interchangeable with different main shaft embodiments 120, 220, 320.

In the embodiment of FIG. 15, the entire longitudinal length of the main shaft 320 is shortened as compared to the shaft of FIGS. 13 (120) and 14 (220). Such a shortened length may be particularly useful for children or shorter adults. In embodiments, the main shaft 320 of FIG. 15 is useful for subjects whose height is up to about 5'2". It should be noted that these measurements are merely exemplary and can vary above or below the depicted value by up to 30%. In certain embodiments, the measurements vary above or below the depicted value by up to 20%, up to 15%, up to 10%, or up to 5%. The values can vary up to 1%, up to 2%, up to 3%, or up to 4%.

As discussed above and shown within the drawings, the superior vertical extension 222 can be shortened as compared to the inferior vertical extension 226 (see, for example, FIGS. 9A-9C & 14), the superior vertical extension 122 and the inferior vertical extension 126 can comprise similar heights (see, for example, FIGS. 1A-2B, 6, 8A-8B, and 13), or the superior vertical extension 322 can be longer than the inferior vertical extension 326 (see, for example FIG. 15).

In embodiments, the longitudinal length of the curved portion 124, 224, 324 is at least about twice that of the superior vertical extension 122, 222, 322, the inferior vertical extension 126, 226, 326, or both. The curved portion 124, 224, 324 can comprise a length that that is about three times that of the superior vertical extension 122, 222, 322, the inferior vertical extension 126, 226, 326, or both. In various embodiments, the longitudinal length of the curved portion 124, 224, 324 is at least about one and one-half that of the superior vertical extension 122, 222, 322, the inferior vertical extension 126, 226, 326, or both.

In various embodiments, the curved portion 124, 224, 324 of the main shaft 120, 220, 320 can comprise a fixed length and can be placed vertically at any position of the main shaft. The main shaft 120, 220, 320 can have a fixed length, and the curved portion 124, 224, 324 can have a fixed length across various embodiments. Thus, in such embodiments, the longitudinal length of the superior vertical extension 122, 222, 322 and the inferior vertical extension 126, 226, 326 can vary between alternate iterations. For exemplary purposes only, the main shaft 120, 220, 320 can have an entire longitudinal length of about 36 inches, and the curved portion 124, 224, 324 can have a longitudinal length of about 21 inches across various embodiments such that the remaining 15 inches of the main shaft 120, 220, 320 can be split between the superior vertical extension 122, 222, 322 and the inferior vertical extension 126, 226, 326 in any conceivable manner. Thus, under one embodiment of the presently discussed example, the superior vertical extension 122, 222, 322 has a longitudinal length of about 7 inches, and the inferior vertical extension 126, 226, 326 has a longitudinal length of about 8 inches. In another embodiment using the present example, the superior vertical extension 122, 222, 322 has a longitudinal length of about 4 inches, and the inferior vertical extension 126, 226, 326 has a longitudinal length of about 11 inches. Thus, as can be seen, the entire longitudinal length of the main shaft 120, 220, 320 and the curved portion 124, 224, 324 can be fixed such that the longitudinal lengths of the superior vertical extension 122, 222, 322 and the inferior vertical extension 126, 226, 326 vary across embodiments depending on the disposition of the curved portion 124, 224, 324 therebetween. As stated above, any specific values provided herein are merely for exemplary purposes only and should not be interpreted as limiting. The recited values can be any value that permits any of the orthopedic devices described herein to retain physiological utility in promoting a normal gait in a subject afflicted with a knee condition.

As can be seen in FIGS. 13-15, the curved portion 124, 224, 324 of the main shaft 120, 220, 320 can be defined by a plurality of bends or major angular changes along its longitudinal length. As shown in the pictured embodiments, the curved portion 124, 224, 324 can be formed as a result of at least four major angular changes along the longitudinal length of the main shaft 120, 220, 320. The curved portion 124, 224, 324 can be defined by a plurality of about 22° major angular changes in the main shaft 120, 220, 320. In various embodiments, the curved portion 124, 224, 324 can be defined by one or more major angular deflections of the main shaft 120, 220, 320 in the walking direction (or toward the front of the cane) combined with a reciprocal number of major angular deflections opposite that of the walking direction (or toward the back of the cane), such that the superior vertical extension 122, 222, 322 and the inferior vertical extension 126, 226, 326 are co-linear despite the curved portion 124, 224, 324 of the main shaft 120, 220, 320 residing therebetween. In one embodiment, the curved portion 124, 224, 324 comprises four bends of about 22°. For instance, a first major angular change can occur by a deflection of the main shaft 120, 220, 320 by about 22° in the walking direction (or toward the front of the cane). Moving vertically down the length of the curved portion 124, 224, 324, a second major angular change of about 22° is shown, but in a direction that is opposite that of the walking direction (or toward the back of the cane). Continuing down the length of the main curved portion 124, 224, 324 a third major angular change of about 22° is shown, wherein the bend occurs toward the walking direction. Finally, a fourth major angular change of about 22° is shown that is, once again, in the direction opposite that of the walking direction. Thus, in the embodiments of FIGS. 13-15, the curved portion 124, 224, 324 is defined by a total deflection of the main shaft 120, 220, 320 in the walking direction of about 44° degrees and a total deflection of the main shaft 120, 220, 320 in the direction that is opposite that of the walking direction of about 44°.

In certain embodiments, each of the bends or major angular changes can be formed by a "bump bend" that is made up of a plurality of minor angular changes in the main shaft 120, 220, 320. For instance, a single 22° bend or major angular change can comprise a plurality of minor angular changes that sum to about 22° in total. By way of nonlimiting example, a single 22° bend can be comprised of six minor angular changes that are each equal to about 7.33°.

Although a plurality of 22° major angles are shown in the embodiments of FIGS. 13-15, any one or more of the plurality of major angles can be any value that enables the orthopedic device to permit a user suffering from a knee condition to achieve the average knee flexion angle, the maximum knee flexion angle, or the minimum knee flexion angle that is observed during the "loading phase" of a healthy, normal human gait cycle. In embodiments, one or more of the major angular changes is up to about 25°. In certain embodiments, one or more of the major angular changes is as low as about 20°. One or more of the plurality of major angular changes can be any value between about 19° to about 26°, inclusive. One or more of the major angular changes can be about 20.0°, about 20.5°, about 21.0°, about 21.5°, about 22.0°, about 22.5°, about 23.0°, about 23.5°, about 24.5°, or about 25°. In embodiments, each of the one or more major bends can have an equal or nearly equal angular change or one particular bend can have an angular change that is different from one or more of the remaining bends.

Figure 16:
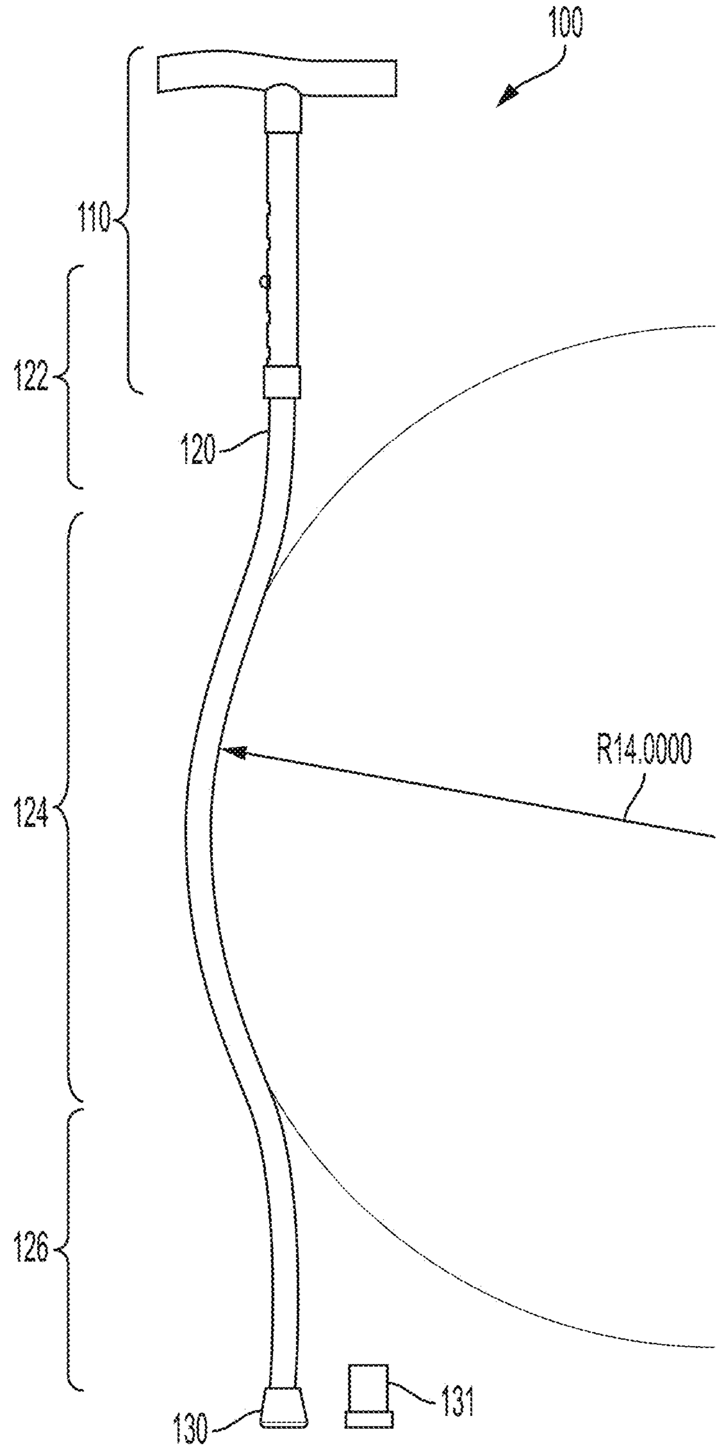
FIG. 16 provides a side view of the FIG. 1A embodiment with a non-limiting, exemplary radius of curvature for the curved portion of the orthopedic device.

FIG. 16 provides a side view of one embodiment with a non-limiting, exemplary radius of curvature for the curved portion 124 of the orthopedic device 100. In various embodiments, the radius of curvature of the curved portion 124, 224, 324 is a value that enables the orthopedic device to permit a user suffering from a knee condition to achieve the average knee flexion angle that is observed during the "loading phase" of a healthy, normal human gait cycle. The radius of curvature of the curved portion 124, 224, 324 can be a value that enables the orthopedic device to permit a user suffering from a knee condition to achieve the maximum knee flexion angle that is observed during the "loading phase" of a healthy, normal human gait cycle. The radius of curvature of the curved portion 124, 224, 324 can be a value that enables the orthopedic device to permit a user suffering from a knee condition to achieve the minimum knee flexion angle that is observed during the "loading phase" of a healthy, normal human gait cycle. As can be seen, in FIG. 16, one preferred radius of curvature for the curved portion 124 of the orthopedic device is about 14 inches. In certain embodiments, the radius of curvature is up to about 20 inches. The radius of curvature can be as little as about 10 inches. In embodiments, the radius of curvature for the curved portion of the main shaft is about 10 inches, about 10.5 inches, about 11 inches, about 11.5 inches, about 12 inches, about 12.5 inches, about 13 inches, about 13.5 inches, about 14 inches, about 14.5 inches, about 15 inches, about 15.5 inches, about 16 inches, about 16.5 inches, about 17 inches, about 17.5 inches, about 18 inches, about 18.5 inches, about 19 inches, about 19.5 inches, about 20 inches, or any value therebetween. The radius of curvature can be about 13.0 inches, about 13.1 inches, about 13.2 inches, about 13.3. inches, about 13.4 inches, about 13.5 inches, about 13.6 inches, about 13.7 inches, about 13.8 inches, about 13.9 inches, about 14.0 inches, about 14.1 inches, about 14.2 inches, about 14.3 inches, about 14.4 inches, about 14.5 inches, about 14.6 inches, about 14.7 inches, about 14.8 inches, about 14.9 inches, or about 15.0 inches.

In embodiments, the orthopedic device 100 can comprise any device that is known in the art to be useful in providing support and stability to a subject while walking. Although a cane is shown in the pictured embodiments, the presently disclosed main shaft 120, 220, 320 can be applied to any orthopedic device that is capable of assisting a subject who is suffering from a knee condition with ambulation. By way of non-limiting example, additional orthopedic devices that comprise a shaft with the curvature disclosed herein comprise auxilia crutches (also referred to as underarm crutches), forearm crutches (also referred to as loft strand or elbow crutches), gutter crutches (also referred to as adjustable arthritic crutches, forearm support crutches), or a combination thereof.

As can be seen from the various embodiments depicted herein, the handle shaft 114, 214, the main shaft 120, 220, or both can comprise hollow tubing. In such embodiments, the tubing comprises an inner diameter that is defined by the hollow interior space of the tube and an outer diameter that is defined by the exterior walls of the tube. Alternatively, the handle shaft 114, 214, main shaft 120, 220, or both can comprise a substantially solid tube with no interior space. In embodiments wherein the handle shaft 114, 214 and the main shaft 120, 220 are substantially solid, the handle shaft 114, 214 and the main shaft 120, 220 can comprise a single, continuous material.

Further, as shown in the present embodiments, one or both of the main shaft 120 and the handle shaft 114 have a substantially circular cross-section. However, it should be understood that the cross-section of the main shaft 120, the handle shaft 114, or both can comprise any shape. By way of non-limiting example, the cross-section of the main shaft 120, the handle shaft 114, or both can comprise a triangle, square, rectangle, pentagon, hexagon, heptagon, octagon, nonagon, decagon, circle, oval, half circle, quarter circle, or a combination thereof.

The main shaft 120, handle shaft 114, or both can comprise any material suitable for use in a lightweight orthopedic device. By way of non-limiting example, the main shaft 120, handle shaft 114, or both can comprise metal, carbon fiber, wood, resin, or any other material having a strength that is sufficient to support the weight of at least a large adult human male during use thereof. In certain embodiments, the material of the main shaft 120, handle shaft 114, or both comprises steel. Such material can comprise chrome-moly steel. In embodiments, the material of the main shaft 120, handle shaft 114, or both can support at least 600 pounds of downward force without experiencing a structural failure. The main shaft 120, handle shaft 114, or both can comprise a material that is sufficient to support at least 400 pounds without experiencing a structural failure. In one embodiment, the main shaft 120, handle shaft 114, or both comprise a material that is sufficient to support up to 1,000 pounds without experiencing a structural failure.

The height or the length in the longitudinal direction can be in a plurality of sizes depending on the height of the user or the age of the user. For instance, the height can be configured for use by an average-sized human child of 12 years or younger. The height can be configured for use by an average-sized human male between the ages of 13 and 18. The height can be configured for use by an average-sized human female between the ages of 13 and 18. In embodiments, the height of the orthopedic device is configured for use by an average-sized adult human male over the age of 18, an average-sized adult human female over the age of 18, or a combination thereof. In certain embodiments, the height of the orthopedic device is configured for use by human individuals with a height between the 5th percentile of females and the 95th percentile of males, inclusive according to any commonly referenced anthropometric standards. The height of the orthopedic device can be configured for use with subjects who are up to 7 feet tall. In certain embodiments, the height of the orthopedic device can be configured for use with subjects who are at least 40 inches tall.

In specific embodiments, the height or longitudinal length of the main shaft 120, 220, 320 is as small as 25 inches. The height or longitudinal length of the main shaft 120, 220, 320 can be as long as 35 inches. The longitudinal length of the main shaft 120, 220, 320 can be any value between about 28 inches to about 32.5 inches, inclusive. In certain embodiments, the height or longitudinal length of the main shaft 120, 220, 320 is about 28.0 inches, about 28.5 inches, about 29.0 inches, about 29.5 inches, about 30.0 inches, about 30.5 inches, about 31.0 inches, about 31.5 inches, about 32.0 inches, about 32.5 inches, or any value between any of the foregoing.

Additionally and as discussed herein, the orthopedic device 100, 200 can include a mechanism for modifying its height, such as altering its longitudinal length. For instance, the orthopedic device 100, 200 may feature one or multiple adjustable height configurations to cater to individuals of varying statures or to enable adaptations as the user's mobility requirements evolve over time. The orthopedic device 100, 200 can comprise a means for adjusting the height within a given range. The means for adjusting the height can comprise a locking mechanism for locking the device at a given height. By way non-limiting example, the device can comprise a push-button spring clip 140, 145 that is configured to cooperatively interact with one or more height adjustment positions 118, 218 and at least one spring retention hole 128, 228. In embodiments, each of the one or more height adjustment positions 118, 218 comprises a hole, gap, notch, indenture, or pass-through in the handle shaft 114. In operation, the height adjustment positions 118, 218 permit the device to be reversibly secured at a preferred height. In such embodiments, height adjustment positions 118, 218 can be so dimensioned to receive a component of the locking mechanism therein. For example, one or more of the height adjustment positions 118, 218 can comprise a diameter that is configured to receive the push-button or cap 142, 147 of a spring clip 140, 145, such that, when depressed, the handle shaft 114, 214 can move vertically along the superior vertical extension 122, 222 of the main shaft 120 until a desired overall height of the orthopedic device 100, 200 is achieved.

The handle portion 110 of the cane can be ergonomically designed to provide a comfortable grip 112, 212 and minimize strain on the hand and wrist. The grip 112, 212 can comprise a soft, non-slip material. In certain embodiments, the grip comprises rubber, foam, or any other material known in the art to provide added grip and prevent slipping.

The bottom of the cane can be fitted with a tip, boot, or foot 130, 131, 132, 230, 231, 232 to provide traction and prevent slipping on certain surfaces. In embodiments, the tip or boot comprises rubber or plastic.

In certain aspects, the present disclosure relates to a method of transferring the force of impact during the loading response phase of the gait cycle away from an injured knee and to the upper body of the user.

The present disclosure further relates to methods of promoting recovery from a knee condition, methods of treating a knee condition, or methods of promoting a healthy walking gait. In embodiments, any of the various methods disclosed herein are accomplished through use of any one or more of the orthopedic devices disclosed herein.

In certain embodiments, the presently disclosed device is positioned in tandem with the injured leg such that the impact during walking can be absorbed through the orthopedic device and the supporting arm of the individual rather than through the injured knee. By way of example when the orthopedic device 100, 200 is a cane, as the subject initiates the loading phase by placing the heal on the injured leg on the ground, the subject will simultaneously (or near simultaneously) place the foot, boot, or tip of the cane on the ground at about the same distance in front of the subject as the subject's heel. As the subject rocks his or her heel forward, the subject will begin transitioning his or her weight to the orthopedic device 100, 200 rather than the injured leg such that, towards the end of the loading phase, the knee on the injured leg can bend normally along the curved portion 124, 224, 324 of the cane (as if there were little or no injury to knee) while all weight is supported on the orthopedic device 100, 200. This allows the subject to continue with a normal gait without the injured knee absorbing the shock of the body's contact with the ground. Such embodiments can promote a healthy gait and more rapid muscle recovery.

EXAMPLES

Non-limiting, exemplary dimensions, and design aspects are provided in this example. It should be noted any dimensions recited in this example are merely exemplary and can vary above or below the described value by any range that still permits the orthopedic device to provide support to a human subject. In certain embodiments, the measurements vary above or below the recited value by up to 20%, up to 15%, up to 10%, or up to 5%. The values can vary up to 1%, up to 2%, up to 3%, or up to 4%.

The material for the tube or shaft 114, 120 utilized in any of the various embodiments disclosed herein can be about ¾" (about 0.750") OD Chrome-Moly steel or any other material known in the art. In one embodiment, the inner diameter of the material is about 19/32" (about 0.614").

The handle portion 110, 210 as used in certain embodiments can comprise a handle shaft 114, 214 with two or more adjustment positions 118, 218. In one embodiment the handle shaft 114 is configured to "sleeve" over the top of the superior vertical extension 122, 222 the main shaft 120, 220. The adjustment positions 118, 128 can comprise holes, gaps, notches, indentures, or pass-throughs within the handle shaft 114, 214. The first of such adjustment positions can begin at about 1 inch from the bottom of the handle shaft. In certain embodiments, there is about 1 inch between each adjustment position.

In one embodiment the handle design comprises an "offset T" design. The handle shaft can further comprise a locking collet or collar 160, 260 configured to reversibly lock the vertical position of the handle, whereby locking the vertical position of the handle reversibly establishes the height of the orthopedic device 100, 200.

In one embodiment, the handle shaft 114, 214 dimensions are as follows: the inner diameter of the shaft is about 0.751 inches and the outer diameter of the shaft is about 0.839 inches. The handle shaft 114, 214 can have a length of about 7 inches extending from the base of the handle grip 112 regions. The bottom of the handle shaft 114, 214 can comprise a threaded portion comprising threads that can reversibly receive and secure the collet/collar 160, 260 thereon. In one embodiment the locking collet or collar 160, 260 is about 0.896 inches long.

In embodiments, the orthopedic device 100, 200 comprises a foot 130, 230 that can be secured to the inferior vertical extension 126, 226 of the main shaft. The foot 130, 230 can be reversibly secured to the bottom portion of the main shaft 120, 220. The foot 130, 230 can be configured to friction fit over the bottommost portion of the main shaft 120, 220. In one embodiment, the foot 130, 230 comprises a rubber material. In one embodiment, the foot comprises a length of about 1.159 inches. The inner diameter of the foot can be about 0.77 inches.

As stated herein the height adjustment mechanism can comprise a push-button spring clip 140, 145, 24, 245. In such embodiments, the spring can be a compression spring such as a looped compression spring 140, 240 or a V-shaped compression spring 145, 245, wherein at least one end of the spring comprises an extension that is attached to the button or a flanged spring retainer cap 142, 147, 242, 247. In one embodiment, a compression portion of the spring is configured to reside within at least one of the adjustment positions 118, 218. A button end of the spring can be attached to the button or spring retainer cap.

The button or cap 142, 147, 242, 247 can be thimble-shaped with a flange that extends at least partially around the diameter of the cap. The top of the button or cap 142, 147, 242, 247 can be the portion of the button or cap 142, 147, 242, 247 that faces away from the spring, while the bottom of the button or cap 142, 147, 242, 247 can be the portion of the button or cap 142, 147, 242, 247 that faces the spring. The body of the button or cap 142, 147, 242, 247 can comprise the portion of the button or cap 142, 147, 242, 247 that is disposed between the top and the bottom of the button or cap 142, 147, 242, 247. In embodiments, the bottom of the button or cap 142, 147, 242, 247 comprises an opening that is configured to receive and secure at least a portion of the spring (such as the button end) therein.

In certain embodiments, the flange is disposed at the bottom of the button or cap 142, 147, 242, 247. The flange can have a diameter that is greater than that of the body of the button or cap 142, 147, 242, 247. In one embodiment, the body of the button or cap 142, 147, 242, 247 has a diameter that is so dimensioned to pass through the one or more adjustment positions 118, 218 and the spring retention hole 128, 228, and the diameter of the flange is larger than that of the one or more adjustment positions 118, 218 and the spring retention hole 128, 228. Therefore, when inserted through the adjustment position 118, 218 and the spring retention hole 128, 228 from the interior of the shaft, the body of the button or cap 142, 147, 242, 247 can pass therethrough but the bottom portion of the button or cap 142, 147, 242, 247 is prevented from passing through the spring retention hole 128, 228, the adjustment position 118, 218, or both by the flange. Thus, when attached to the spring and the button is positioned within one of the at least one adjustment positions, the push-button spring clip 140, 145, 240, 245 snaps into place such that the button or cap 142, 147, 242, 247 extends at least partially through the adjustment position 118, 218 and the spring retention hole 128, 228, and is retained in the inner diameter of the adjustment position 118, 218 and the spring retention hole 128, 228 by the cooperative actions of the flange and the expansive force of the compressed spring.

In one embodiment, the outer diameter of the flange is about 0.477 inches. The height of the cap can be about 0.398 inches. In one embodiment, the cap 142, 147, 242, 247 can comprise a taper from about 0.377 inches to about 0.397 inches.

One or more of the adjustment positions can comprise a spring retention hole 128, 228 with a diameter that is about 0.3975 inches. The diameter can be as small as 0.3155 inches.

EQUIVALENTS

Those skilled in the art will recognize, or be able to ascertain, using no more than routine experimentation, numerous equivalents to the specific substances and procedures described herein. Such equivalents are considered to be within the scope of this disclosure and are covered by the following exemplary claims.

What is claimed:

1. An orthopedic cane for offloading weight from a subject's knee comprising:

a continuous main shaft that further comprises a superior vertical extension, a substantially parabolic curved portion, and an inferior vertical extension, wherein the substantially parabolic curved portion comprises a longitudinal length and a plurality of bends along the longitudinal length with at least one of the plurality of bends having an angle of between about 20° to about 25°, and wherein the substantially parabolic curved portion is disposed between the superior vertical extension and the inferior vertical extension;

a handle disposed along at least a portion of the superior vertical extension; and a boot including a front, a back opposite the front, and a bottom face that is angled such that the front extends lower than the back and the orthopedic cane leans rearwardly when the bottom face is flush against the ground, wherein the boot is disposed on the bottom of the inferior vertical extension, wherein the superior vertical extension and the inferior vertical extension are colinear with one another along a vertical axis of the orthopedic cane, and wherein the superior vertical extension is longer than the inferior vertical extension.

2. The orthopedic cane of claim 1, wherein the curved portion comprises a radius of curvature of between about 10 inches and about 20 inches.

3. The orthopedic cane of claim 2, wherein the radius of curvature is about 14 inches.

4. The orthopedic cane of claim 1, wherein at least one of the plurality of bends is a 22° bend that has an angle of about 22°.

5. The orthopedic cane of claim 4, wherein the 22° bend comprises a plurality of minor angular changes.

6. The orthopedic cane of claim 5, wherein at least one of the plurality of minor angular changes is an angle of about 7.33°.

7. The orthopedic cane of claim 6, wherein the plurality of minor angular changes comprises at least six minor angular changes.

8. The orthopedic cane of claim 1, wherein the handle comprises a grip and a handle shaft and the handle shaft further comprises one or more adjustment positions that are configured to permit adjustment of a longitudinal length of the orthopedic cane along its vertical axis.

9. The orthopedic cane of claim 1, wherein the superior vertical extension and the inferior vertical extension are substantially straight.

10. The orthopedic cane of claim 1, wherein the curved portion is configured such that the curvature extends outward in a walking direction.

11. An orthopedic cane for offloading weight from a subject's knee comprising:

a continuous main shaft that further comprises a superior vertical extension, a substantially parabolic curved portion, and an inferior vertical extension, wherein the substantially parabolic curved portion comprises a longitudinal length and a plurality of bends along the longitudinal length with each of the plurality of bends having an angle of between about 20° to about 25°, and wherein the substantially parabolic curved portion is disposed between the superior vertical extension and the inferior vertical extension and is configured such that the curvature extends outward in a walking direction;

a handle disposed along at least a portion of the superior vertical extension; and a boot including a front, a back opposite the front, and a bottom face that is angled such that the front extends lower than the back and the orthopedic cane leans rearwardly when the bottom face is flush against the ground, wherein the boot is disposed on the bottom of the inferior vertical extension, wherein the superior vertical extension and the inferior vertical extension are colinear with one another along a vertical axis of the orthopedic cane, and wherein the superior vertical extension is longer than the inferior vertical extension.

12. The orthopedic cane of claim 11, wherein each of the plurality of bends has an angle of about 22°.

13. An orthopedic cane for offloading weight from a subject's knee comprising:

a continuous main shaft that further comprises a superior vertical extension, a substantially parabolic curved portion comprising a longitudinal length, and an inferior vertical extension, wherein the curved portion is disposed between the superior vertical extension and the inferior vertical extension and is defined by a plurality of bends along the longitudinal length of the curved portion with each of the plurality of bends having an angle of between about 20° to about 25°;

a handle including a grip and a handle shaft extending downward and orthogonal to the grip to form a substantially T-shaped structure, wherein the handle is disposed above and attached to the superior vertical extension; and a boot including a front, a back opposite the front, and a bottom face that is angled such that the front extends lower than the back and the orthopedic cane leans rearwardly when the bottom face is flush against the ground, wherein the boot is disposed on the bottom of the inferior vertical extension, wherein the superior vertical extension and the inferior vertical extension are colinear with one another along a vertical axis of the orthopedic cane, and wherein the superior vertical extension is longer than the inferior vertical extension.

14. The orthopedic cane of claim 13, wherein each of the plurality of bends has an angle of about 22°.

* * * * *